(12) United States Patent
Högasten et al.

(10) Patent No.: US 8,749,635 B2
(45) Date of Patent: Jun. 10, 2014

(54) INFRARED CAMERA SYSTEMS AND METHODS FOR DUAL SENSOR APPLICATIONS

(75) Inventors: Nicholas Högasten, Santa Barbara, CA (US); Jeffrey S. Scott, Goleta, CA (US); Patrick B. Richardson, Santa Barbara, CA (US); Jeffrey D. Frank, Santa Barbara, CA (US); Austin A. Richards, Santa Barbara, CA (US); James T. Woolaway, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 1304 days.

(21) Appl. No.: 12/477,828

(22) Filed: Jun. 3, 2009

(65) Prior Publication Data

US 2010/0309315 A1 Dec. 9, 2010

(51) Int. Cl.
*H04N 5/33* (2006.01)

(52) U.S. Cl.
USPC ........... 348/164; 348/175; 348/177; 348/179; 348/191; 348/211.1; 348/224.1

(58) Field of Classification Search
USPC .............. 709/164, 175, 177, 179, 191, 211.1, 709/224.1; 348/164, 175, 177, 179, 191, 348/211.1, 224.1
See application file for complete search history.

(56) References Cited

U.S. PATENT DOCUMENTS 7,199,366 B2 4/2007 Hahn et al.
(Continued)

FOREIGN PATENT DOCUMENTS

| EP | 1 811 711 A1 | 7/2007 |
|---|---|---|
| WO | WO 01/82593 | 11/2001 |
| WO | WO 2004/070449 | 8/2004 |
| WO | WO 2009/008778 | 1/2009 |

OTHER PUBLICATIONS

Sony, XIS-5400 XIS-5310 XIS-CM543 XIS-SR500, Wide Aread Monitoring Solutions, brochure published by Sony Corporation, 2008, 8 pages.

(Continued)

*Primary Examiner* — Lan-Dai T Truong
(74) *Attorney, Agent, or Firm* — Haynes and Boone, LLP

(57) ABSTRACT

Systems and methods disclosed herein provide for infrared camera systems and methods for dual sensor applications. For example, in one embodiment, an enhanced vision system comprises an image capture component having a visible light sensor to capture visible light images and an infrared sensor to capture infrared images. The system comprises a first control component adapted to provide a plurality of selectable processing modes to a user, receive a user input corresponding to a user selected processing mode, and generate a control signal indicative of the user selected processing mode, wherein the plurality of selectable processing modes includes a visible light only mode, infrared only mode, and a combined visible-infrared mode. The system comprises a processing component adapted to receive the generated control signal from the control component, process the captured visible light images and the captured infrared images according to the user selected processing mode, and generate processed images based on the processing mode selected by the user. The system comprises a display component adapted to display the processed images based on the processing mode selected by the user.

24 Claims, 18 Drawing Sheets

(56) References Cited

U.S. PATENT DOCUMENTS

| | | | |
|---|---|---|---|
| 2006/0088298 A1* | 4/2006 | Frame et al. | 386/117 |
| 2006/0289772 A1 | 12/2006 | Johnson et al. | |
| 2007/0018919 A1* | 1/2007 | Zavracky et al. | 345/87 |
| 2007/0183657 A1* | 8/2007 | Kidono et al. | 382/162 |
| 2008/0099678 A1 | 5/2008 | Johnson et al. | |
| 2008/0239091 A1* | 10/2008 | Soga | 348/222.1 |
| 2009/0002475 A1 | 1/2009 | Jelley et al. | |
| 2011/0063451 A1* | 3/2011 | Kamon et al. | 348/164 |

OTHER PUBLICATIONS

Fluke, New! Fluke Ti25 and Ti10 Thermal Imagers, brochure published by Fluke Corporations, 2008, 5 pages.

Toshihiro Horie, Alpha Blending Tutorial, http://www.ocf.berkeley.edu/~horie/alphablend.html, Jan. 21, 2002, 4 pages.

Alpha compositing, http://en.wikipedia.org/wiki/Alpha_compositing, printed Feb. 4, 2010, 4 pages.

* cited by examiner

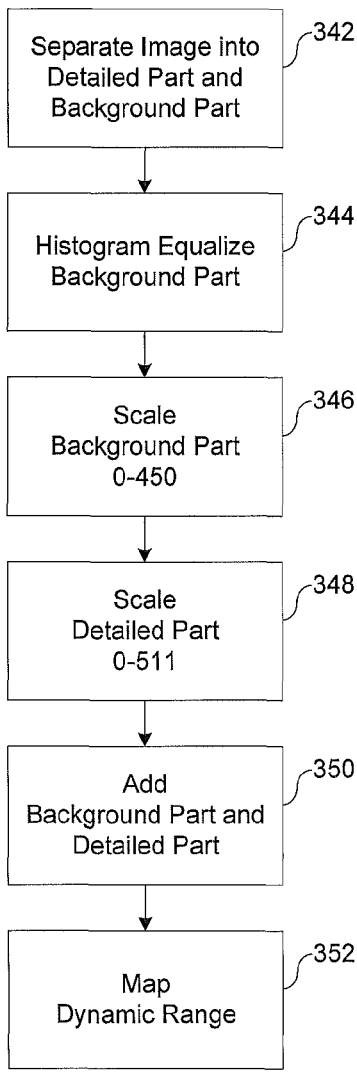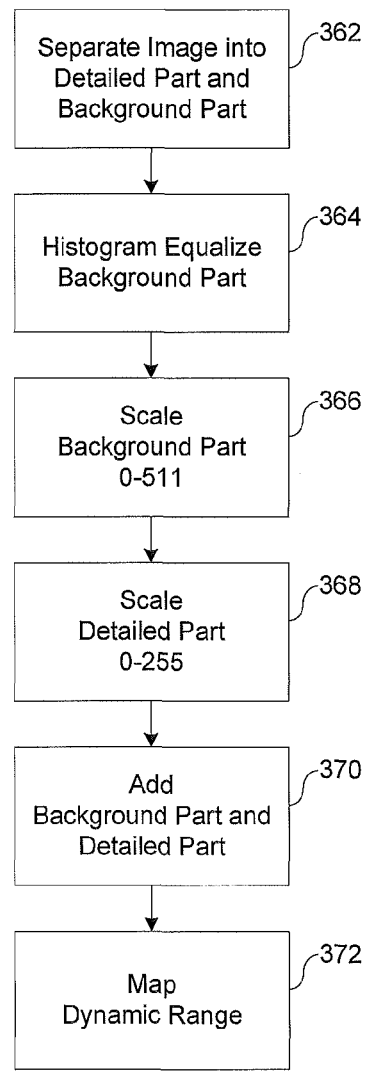
Fig. 3C
Fig. 3D

INFRARED CAMERA SYSTEMS AND METHODS FOR DUAL SENSOR APPLICATIONS

TECHNICAL FIELD

The present disclosure relates to infrared imaging systems and, in particular, to infrared camera systems and methods for dual sensor applications.

BACKGROUND

Visible light cameras are utilized in a variety of imaging applications to capture color or monochrome images. For instance, visible light cameras are typically utilized for daytime applications under ambient light.

Infrared cameras are utilized in a variety of imaging applications to capture thermal emission from objects as infrared images and, therefore, may not be dependent on ambient lighting. For instance, infrared cameras may be utilized for nighttime applications to enhance visibility under low-lighting conditions that typically affect cameras limited to the visible spectral band.

However, there are several drawbacks for conventional nighttime implementation approaches for visible light cameras and infrared cameras. For instance, vehicle operators may have to alternate between displays presenting images from visible light cameras and displays presenting images from infrared cameras to establish a correlation between the visible-band and infrared-band representation of the scene and to determine path obstructions and directions for safe passage. This can be relatively difficult. Even with a split view on a single display, the operator has to constantly switch between each view to determine what in the image may be an obstacle to correlate the output from visible light cameras and infrared cameras in a multi-band camera system.

As a result, there is a need for improved display techniques for providing visible light images and infrared images in an easily viewable manner. There is also a need for improved visible light and infrared camera processing techniques for various applications including, e.g., nighttime applications.

SUMMARY

Systems and methods disclosed herein, in accordance with one or more embodiments, provide processing techniques and modes of operation for dual sensor imaging devices, such as dual sensor cameras, that may be adapted to provide enhanced vision capability. In one example, under certain conditions, it is desirable for vehicles (e.g., aircraft, watercraft, land based vehicles, etc.) to use enhanced vision systems to aid a pilot in operating and navigating the vehicle. For instance, at nighttime, the use of a sensor sensitive to infrared radiation assists with imaging in darkness. Under circumstances where visible light sources exist, it is desirable for the pilot to see those lights with a sensor sensitive to the visible light spectrum. Accordingly, embodiments of the present disclosure provide an enhanced vision system for combining captured images from infrared and visible wavelength sensors for processing applications requiring minimal user input. By combining or blending image signals from a visible light sensor with image signals from an infrared sensor, a combined or blended image may be generated that retains color information from the visible light sensor and shows infrared luminance from the infrared sensor.

In accordance with an embodiment, an enhanced vision system includes at least one sensor sensitive to light in the visible spectrum and at least one sensor sensitive to thermal radiation in the infrared spectrum. The enhanced vision system is adapted to operate in at least three modes, wherein a first mode displays an image signal from the visible sensor, a second mode displays an image signal from the infrared sensor, and a third mode displays an image signal that is generated by combining the image signal from the visible sensor and the image signal from the infrared sensor. In one implementation, the combined image signal in the third mode is generated by combining a luminance part of the image signal from the visible sensor with a luminance part from the image signal of the infrared sensor to generate the luminance part of the combined image signal. Chrominance information in the combined image signal may be retained from the image signal of the visible sensor. The modes of operation are user selectable, wherein a single user input (such as produced by turning a knob) controls the image signals in any of the operating modes. In one aspect, the enhanced vision system may automatically select the mode of operation based on time of day. In another aspect, the enhanced vision system may automatically select the mode of operation based on properties (e.g., SNR: signal-to-noise ratio) of the captured image signals in either or both bands (e.g., visible light band and/or infrared band).

In accordance with an embodiment, an enhanced vision system includes an image capture component having a visible light sensor to capture visible light images and an infrared sensor to capture infrared images. The enhanced vision system includes a first control component adapted to provide a plurality of selectable processing modes to a user, receive a user input corresponding to a user selected processing mode, and generate a control signal indicative of the user selected processing mode, wherein the plurality of selectable processing modes includes a visible light only mode, infrared only mode, and a combined visible-infrared mode. The enhanced vision system includes a processing component adapted to receive the generated control signal from the control component, process the captured visible light images and the captured infrared images according to the user selected processing mode, and generate processed images based on the processing mode selected by the user. The enhanced vision system includes a display component adapted to display the processed images based on the processing mode selected by the user.

The plurality of selectable processing modes includes the visible light only mode that causes the processing component to generate the output images from only the captured visible light images, wherein the visible light images comprise color information or monochrome information from the visible light wavelength spectrum. The plurality of selectable processing modes includes the infrared only mode that causes the processing component to generate the output images from only the captured infrared images, wherein the infrared images comprise thermal information from the infrared wavelength spectrum. The plurality of selectable processing modes includes the combined visible-infrared mode that causes the processing component to generate the processed images by combining a part of the captured visible light images with a part from the captured infrared images.

The enhanced vision system may include a memory component adapted to store the captured visible light images, the captured infrared images, and the processed images. The enhanced vision system may include a second control component adapted to provide a selectable control parameter ($\xi$) to the user, receive a user input corresponding to a user selected control parameter ($\xi$), and generate a control signal indicative of the user selected control parameter ($\xi$). The selectable control parameter (ξ) is normalized to have a value in the range of 0 (zero) to 1. In the blended mode, a value of 1 causes the processing component to generate the output image from only the captured visible light images, and wherein a value of 0 (zero) causes the processing component to generate the output image from only the captured infrared images. In blended mode, values between 0 (zero) and 1 causes the processing component to generate the processed images from proportional parts of both the captured visible light images and the captured infrared images. The selectable control parameter (ξ) is adapted to affect proportions of luminance values of the visible light images and the infrared images in the processed images when the combined visible-infrared mode is selected by the user.

The processed images comprise visible light only images when the visible light only mode is selected by the user, and wherein the processed images comprise infrared only images when the infrared only mode is selected by the user, and wherein the processed images comprise combined visible-infrared images when the combined visible-infrared mode is selected by the user. The display component is adapted to display the processed images as visible light only images, infrared only images, and combined visible-infrared images having portions of both the visible light only images and the infrared only images.

The captured visible light images comprise a luminance (Y) part and a chrominance (CrCb) part, and wherein the captured infrared images comprise only a luminance (Y) part, and wherein the processing component is adapted to extract the luminance (Y) part and the chrominance (CrCb) part from the captured visible light images, extract the luminance (Y) part from the captured infrared images, scale the luminance (Y) parts, and merge the luminance (Y) parts and the chrominance (CrCb) part to generate the processed image based on the processing mode selected by the user.

In accordance with an embodiment, a method for processing images comprises capturing a visible light image and an infrared image and providing a plurality of selectable processing modes to a user, wherein the plurality of selectable processing modes includes a visible light only mode, infrared only mode, and a combined visible-infrared mode. The method includes receiving a user input corresponding to a user selected processing mode, processing the captured visible light images and the captured infrared images according to the user selected processing mode, generating processed images, and displaying the processed images. The processed images may comprise visible light only images when the visible light only mode is selected by the user. The processed images may comprise infrared only images when the infrared only mode is selected by the user. The processed images may comprise combined visible-infrared images when the combined visible-infrared mode is selected by the user.

The scope of the disclosure is defined by the claims, which are incorporated into this section by reference. A more complete understanding of embodiments of the present disclosure may be afforded to those skilled in the art, as well as a realization of additional advantages thereof, by a consideration of the following detailed description of one or more embodiments. Reference may be made to the appended sheets of drawings that may first be described briefly.

BRIEF DESCRIPTION OF THE DRAWINGS

FIGS. 3A-3F show block diagrams illustrating infrared processing techniques, in accordance with various embodiments of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
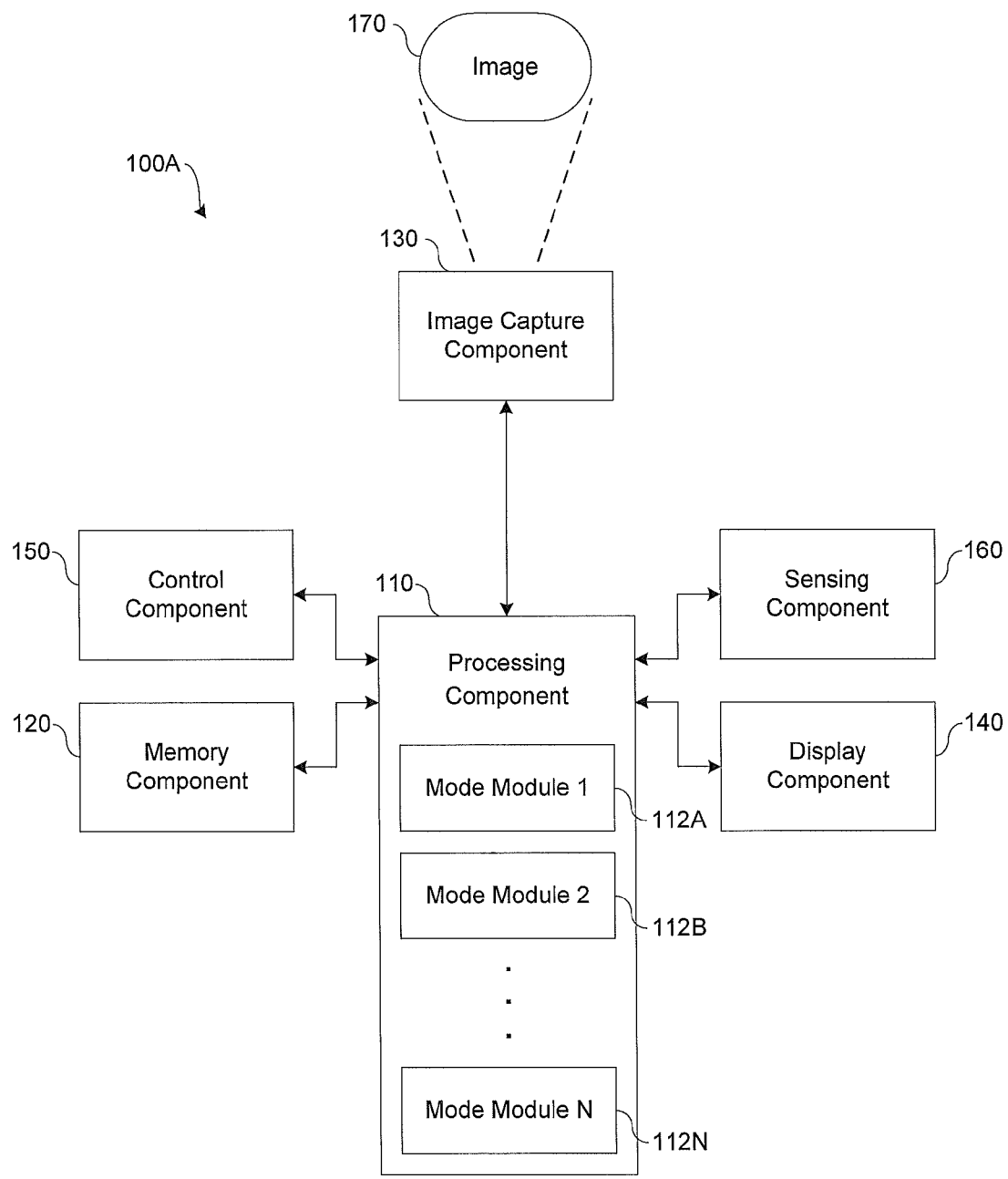
FIGS. 1A-1B show block diagrams illustrating various infrared imaging systems for capturing and processing infrared images, in accordance with various embodiments of the present disclosure.

In accordance with an embodiment of the present disclosure, FIG. 1A shows a block diagram illustrating an infrared imaging system 100A for capturing and processing infrared images. Infrared imaging system 100A comprises a processing component 110, a memory component 120, an image capture component 130, a display component 140, a control component 150, and optionally a sensing component 160.

In various implementations, infrared imaging system 100A may represent an infrared imaging device, such as an infrared camera, to capture one or more images, such as an image 170. Infrared imaging system 100A may represent any type of infrared camera, which for example detects infrared radiation and provides representative data (e.g., one or more snapshots or video infrared images). For example, infrared imaging system 100A may represent an infrared camera that is directed to the near, middle, and/or far infrared spectrums. Infrared imaging system 100A may comprise a portable device and may be incorporated, for example, into a vehicle (e.g., a naval vehicle, a land-based vehicle, an aircraft, or a spacecraft) or a non-mobile installation requiring infrared images to be stored and/or displayed.

Processing component 110 comprises, in one embodiment, a microprocessor, a single-core processor, a multi-core processor, a microcontroller, a logic device (e.g., a programmable logic device configured to perform processing functions), a digital signal processing (DSP) device, or some other type of generally known processor. Processing component 110 is adapted to interface and communicate with components 120, 130, 140, 150 and 160 to perform method and processing steps as described herein. Processing component 110 may comprise one or more mode modules 112A-112N for operating in one or more modes of operation. In one implementation, mode modules 112A-112N define preset display functions that may be embedded in processing component 110 or stored on memory component 120 for access and execution by processing component 110. Moreover, processing component 110 may be adapted to perform various other types of image processing algorithms.

In various implementations, it should be appreciated that each of mode modules 112A-112N may be integrated in software and/or hardware as part of processing component 110, or code (e.g., software or configuration data) for each of the modes of operation associated with each mode module 112A-112N, which may be stored in memory component 120. Embodiments of mode modules 112A-112N (i.e., modes of operation) may be stored by a separate computer-readable medium (e.g., a memory, such as a hard drive, a compact disk, a digital video disk, or a flash memory) to be executed by a computer (e.g., a logic or processor-based system) to perform various methods. In one example, the computer-readable medium may be portable and/or located separate from infrared imaging system 100A, with stored mode modules 112A-112N provided to infrared imaging system 100A by coupling the computer-readable medium to infrared imaging system 100A and/or by infrared imaging system 100A downloading (e.g., via a wired or wireless link) the mode modules 112A-112N from the computer-readable medium. Mode modules 112A-112N provide for improved infrared camera processing techniques for real time applications, wherein a user or operator may change the mode while viewing an image on display component 140.

Memory component 120 comprises, in one embodiment, one or more memory devices to store data and information. The one or more memory devices may comprise various types of memory including volatile and non-volatile memory devices, such as RAM (Random Access Memory), ROM (Read-Only Memory), EEPROM (Electrically-Erasable Read-Only Memory), flash memory, etc. Processing component 110 is adapted to execute software stored in memory component 120 to perform methods, processes, and modes of operations.

Image capture component 130 comprises, in one embodiment, one or more infrared sensors (e.g., any type of infrared detector, such as a focal plane array) for capturing infrared image signals representative of an image, such as image 170. In one implementation, the infrared sensors of image capture component 130 provide for representing (e.g., converting) a captured image signal of image 170 as digital data (e.g., via an analog-to-digital converter included as part of the infrared sensor or separate from the infrared sensor as part of infrared imaging system 100A). Processing component 110 may be adapted to receive the infrared image signals from image capture component 130, process the infrared image signals (e.g., provide processed image data), store the infrared image signals or image data in memory component 120, and/or retrieve stored infrared image signals from memory component 120. Processing component 110 may be adapted to process infrared image signals stored in memory component 120 to provide image data (e.g., captured and/or processed infrared image data) to display component 140 for viewing by a user.

Display component 140 comprises, in one embodiment, an image display device (e.g., a liquid crystal display (LCD)) or various other types of generally known video displays or monitors. Processing component 110 may be adapted to display image data and information on display component 140. Processing component 110 may also be adapted to retrieve image data and information from memory component 120 and display any retrieved image data and information on display component 140. Display component 140 may comprise display electronics, which may be utilized by processing component 110 to display image data and information (e.g., infrared images). Display component 140 may receive image data and information directly from image capture component 130 via processing component 110, or the image data and information may be transferred from memory component 120 via processing component 110. In one implementation, processing component 110 may initially process a captured image and present a processed image in one mode, corresponding to mode modules 112A-112N, and then upon user input to control component 150, processing component 110 may switch the current mode to a different mode for viewing the processed image on display component 140 in the different mode. This switching may be referred to as applying the infrared camera processing techniques of mode modules 112A-112N for real time applications, wherein a user or operator may change the mode while viewing an image on display component 140 based on user input to control component 150.

Control component 150 comprises, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to function as both a user input device and a display device, such as, for example, a touch screen device adapted to receive input signals from a user touching different parts of the display screen. Processing component 110 may be adapted to sense control input signals from control component 150 and respond to any sensed control input signals received therefrom. Processing component 110 may be adapted to interpret the control input signal as a value, which may be described in greater detail herein.

Figure 4:
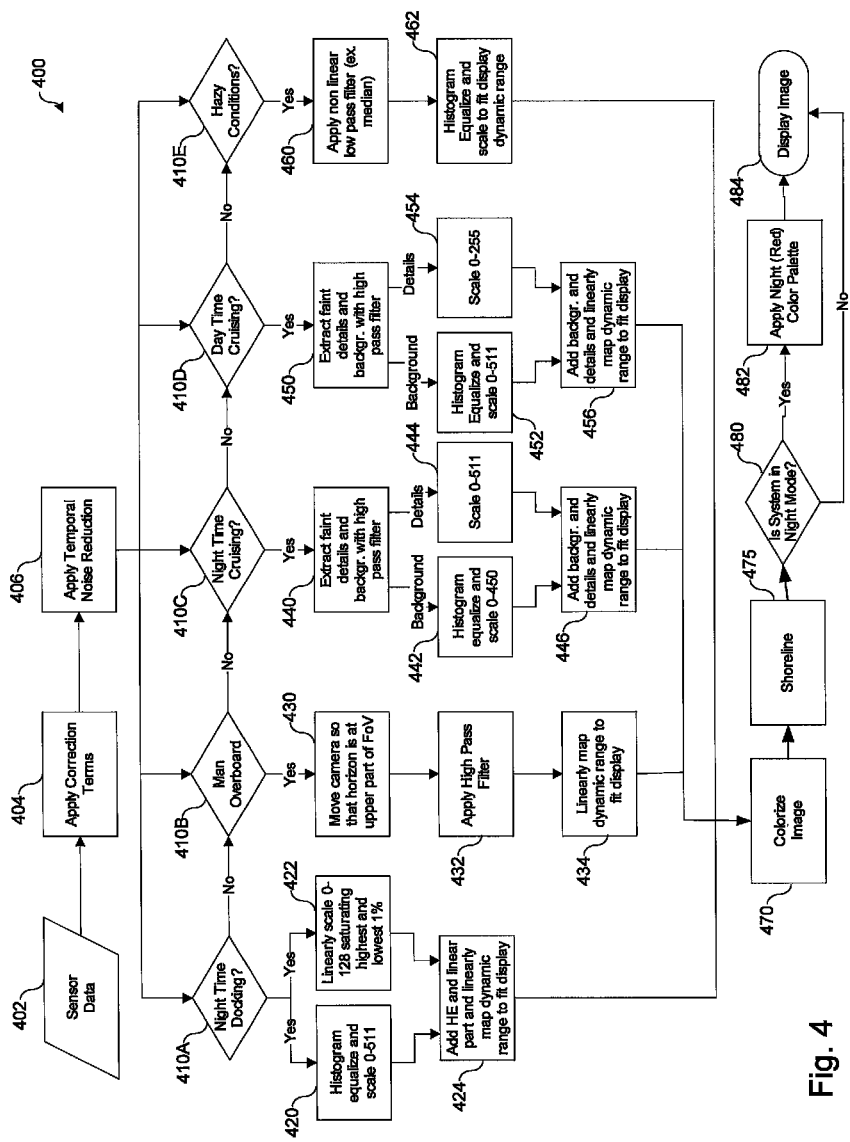
FIG. 4 shows a block diagram illustrating an overview of infrared processing techniques, in accordance with various embodiments of the present disclosure.
Figure 5:
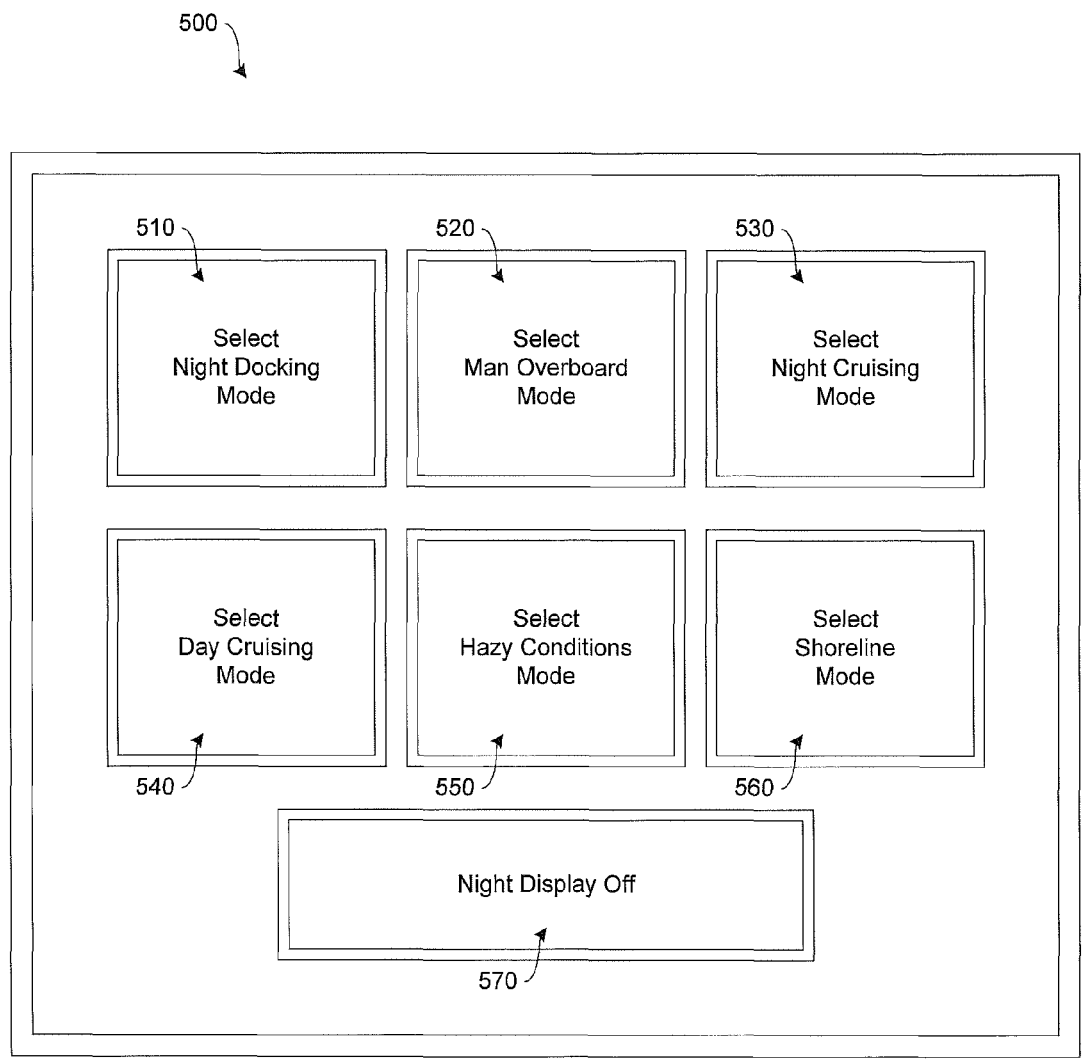
FIG. 5 shows a block diagram illustrating a control component of the infrared imaging system for selecting between different modes of operation, in accordance with an embodiment of the present disclosure.

Control component 150 may comprise, in one embodiment, a control panel unit 500 (e.g., a wired or wireless handheld control unit) having one or more push buttons adapted to interface with a user and receive user input control values, as shown in FIG. 5 and further described herein. In various implementations, one or more push buttons of control panel unit 500 may be utilized to select between the various modes of operation as described herein in reference to FIGS. 2-4. For example, only one push button may be implemented and which is used by the operator to cycle through the various modes of operation (e.g., night docking, man overboard, night cruising, day cruising, hazy conditions, and shoreline), with the selected mode indicated on the display component

140. In various other implementations, it should be appreciated that control panel unit 500 may be adapted to include one or more other push buttons to provide various other control functions of infrared imaging system 100A, such as autofocus, menu enable and selection, field of view (FoV), brightness, contrast, gain, offset, spatial, temporal, and/or various other features and/or parameters. In another implementation, a variable gain value may be adjusted by the user or operator based on a selected mode of operation.

In another embodiment, control component 150 may comprise a graphical user interface (GUI), which may be integrated as part of display component 140 (e.g., a user actuated touch screen), having one or more images of, for example, push buttons adapted to interface with a user and receive user input control values.

Optional sensing component 160 comprises, in one embodiment, one or more various types of sensors, including environmental sensors, depending upon the desired application or implementation requirements, which provide information to processing component 110. Processing component 110 may be adapted to communicate with sensing component 160 (e.g., by receiving sensor information from sensing component 160) and with image capture component 130 (e.g., by receiving data from image capture component 130 and providing and/or receiving command, control or other information to and/or from other components of infrared imaging system 100A).

In various implementations, optional sensing component 160 may provide data and information relating to environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel, a covered dock, or that some type of enclosure has been entered or exited. Optional sensing component 160 may represent conventional sensors as would be known by one skilled in the art for monitoring various conditions (e.g., environmental conditions) that may have an affect (e.g., on the image appearance) on the data provided by image capture component 130.

In some embodiments, optional sensing component 160 may comprise one or more devices adapted to relay information to processing component 110 via wireless communication. For example, sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of image capturing system 100A may be combined and/or implemented or not, as desired or depending upon the application or requirements, with image capturing system 100A representing various functional blocks of a system. For example, processing component 110 may be combined with memory component 120, image capture component 130, display component 140 and/or sensing component 160. In another example, processing component 110 may be combined with image capture component 130 with only certain functions of processing component 110 performed by circuitry (e.g., a processor, a microprocessor, a microcontroller, a logic device, etc.) within image capture component 130. In still another example, control component 150 may be combined with one or more other components or be remotely connected to at least one other component, such as processing component 110, via a control wire to as to provide control signals thereto.

Figure 1B:
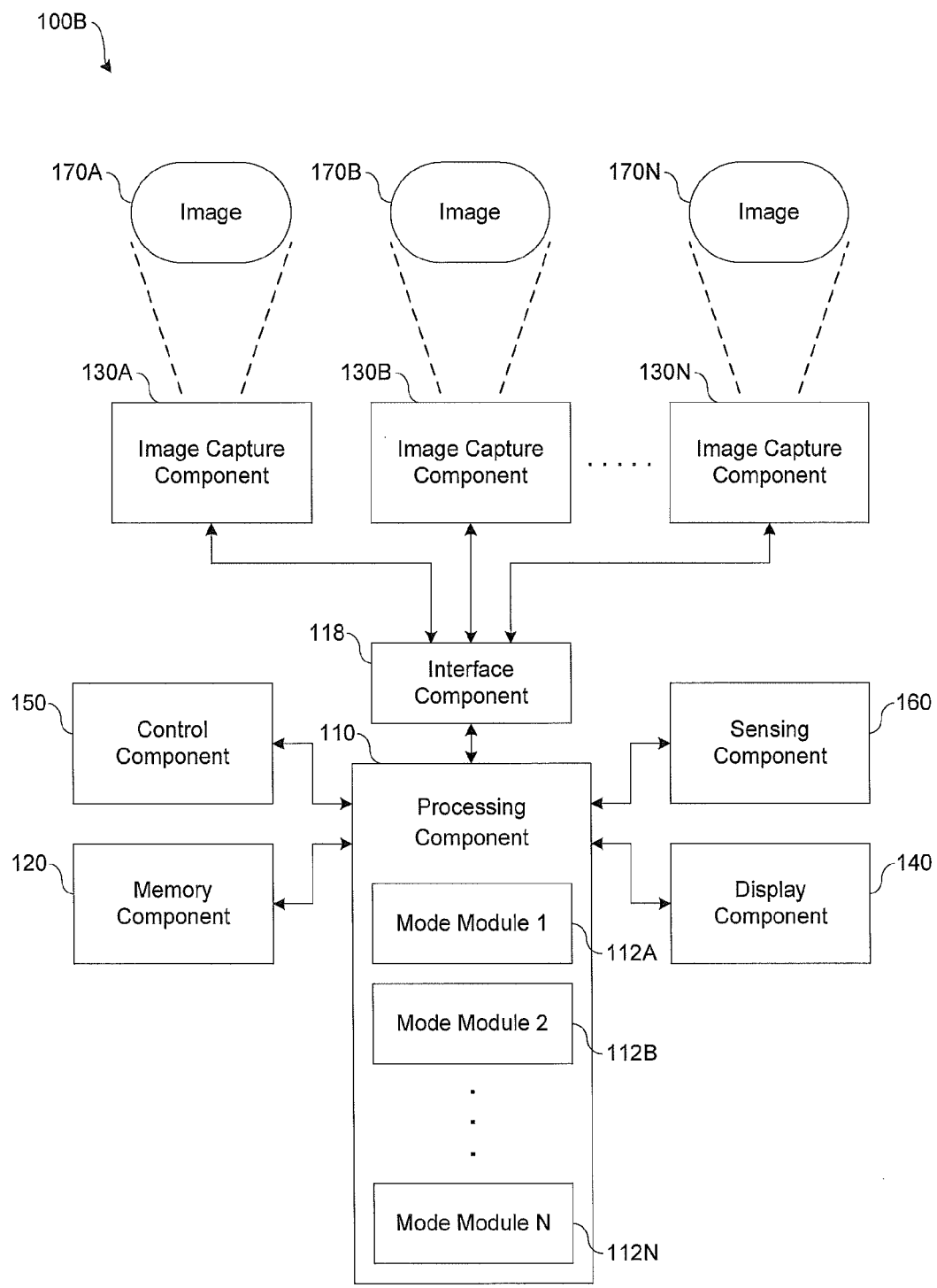

In accordance with another embodiment of the present disclosure, FIG. 1B shows a block diagram illustrating an infrared imaging system 100B for capturing and processing infrared images. Infrared imaging system 100B comprises, in one embodiment, a processing component 110, an interface component 118, a memory component 120, one or more image capture components 130A-130N, a display component 140, a control component 150, and optionally a sensing component 160. It should be appreciated that various components of infrared imaging system 100B of FIG. 1B may be similar in function and scope to components of infrared imaging system 100A of FIG. 1A, and any differences between the systems 100A, 100B are described in greater detail herein.

In various implementations, infrared imaging system 100B may represent one or more infrared imaging devices, such as one or more infrared cameras, to capture images, such as images 170A-170N. In general, infrared imaging system 100B may utilize a plurality of infrared cameras, which for example detect infrared radiation and provide representative data (e.g., one or more snapshots or video infrared images). For example, infrared imaging system 100B may include one or more infrared cameras that are directed to the near, middle, and/or far infrared spectrums. As discussed further herein, infrared imaging system 100B may be incorporated, for example, into a vehicle (e.g., a naval vehicle or other type of watercraft, a land-based vehicle, an aircraft, or a spacecraft) or a non-mobile installation requiring infrared images to be stored and/or displayed.

Processing component 110 is adapted to interface and communicate with a plurality of components including components 118, 120, 130A-130N, 140, 150, and/or 160 of system 100B to perform method and processing steps as described herein. Processing component 110 may comprise one or more mode modules 112A-112N for operating in one or more modes of operation, which is described in greater detail herein. Processing component 110 may be adapted to perform various other types of image processing algorithms in a manner as described herein.

Interface component 118 comprises, in one embodiment, a communication device (e.g., modem, router, switch, hub, or Ethernet card) that allows communication between each image capture component 130A-130N and processing component 110. As such, processing component 110 is adapted to receive infrared image signals from each image capture component 130A-130N via interface component 118.

Each image capture component 130A-130N (where "N" represents any desired number) comprises, in various embodiments, one or more infrared sensors (e.g., any type of infrared detector, such as a focal plane array, or any type of infrared camera, such as infrared imaging system 100A) for capturing infrared image signals representative of an image, such as one or more images 170A-170N. In one implementation, the infrared sensors of image capture component 130A provide for representing (e.g., converting) a captured image signal of, for example, image 170A as digital data (e.g., via an analog-to-digital converter included as part of the infrared sensor or separate from the infrared sensor as part of infrared imaging system 100B). As such, processing component 110 may be adapted to receive the infrared image signals from each image capture component 130A-130N via interface component 118, process the infrared image signals (e.g., to provide processed image data or the processed image data may be provided by each image capture component 130A-130N), store the infrared image signals or image data in memory component 120, and/or retrieve stored infrared image signals from memory component 120. Processing component 110 may be adapted to process infrared image signals stored in memory component 120 to provide image data (e.g., captured and/or processed infrared image data) to display component 140 (e.g., one or more displays) for viewing by a user.

Figure 6:
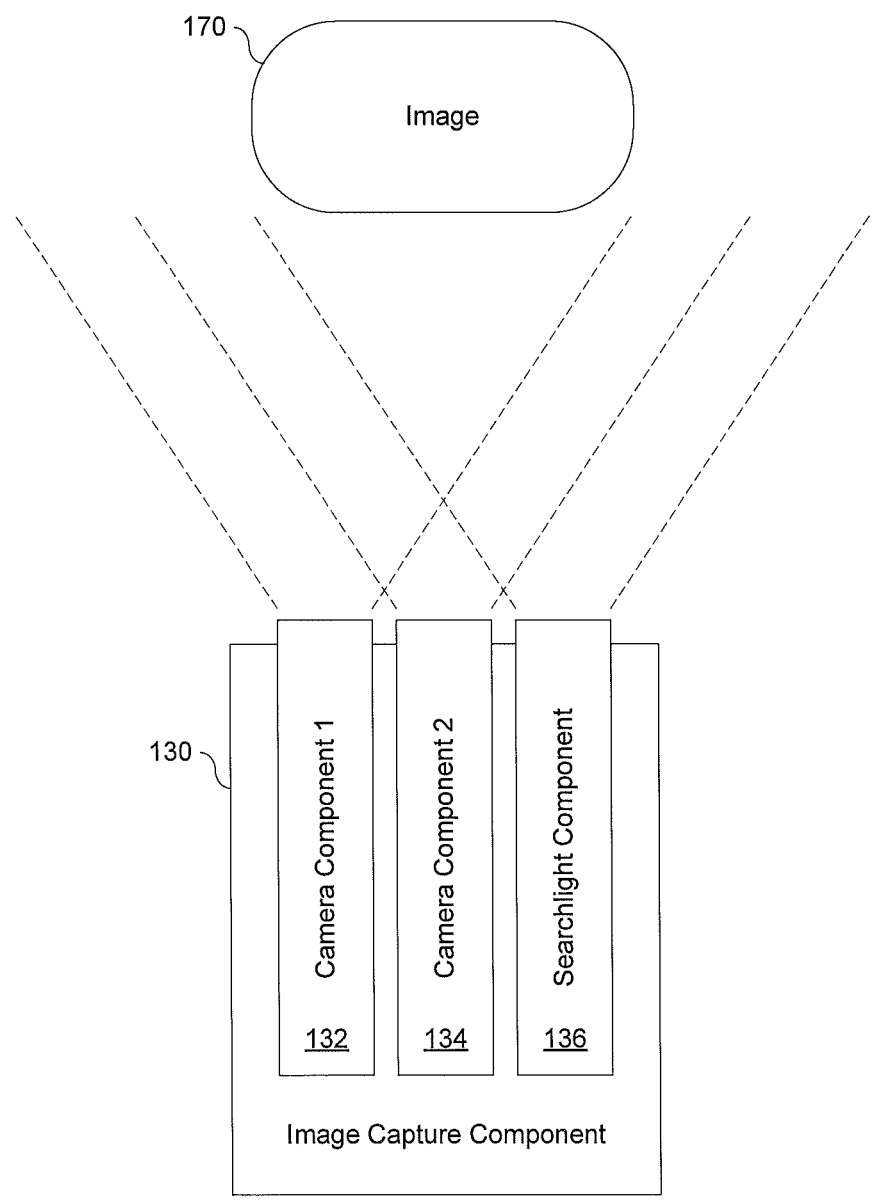
FIG. 6 shows a schematic diagram illustrating an embodiment of an image capture component of infrared imaging systems, in accordance with an embodiment of the present disclosure.

In one implementation, referring to FIG. 6, each image capture component 130A-130N may comprise one or more components, including a first camera component 132, a second camera component 134, and/or a searchlight component 136. In one embodiment as shown in FIG. 6, first camera component 132 is adapted to capture infrared images, second camera component 134 is adapted to capture color images in a visible light spectrum, and searchlight component 136 is adapted to provide a beam of light to a position within an image boundary of the one or more images 170 (e.g., within a field of view of first camera component 132 and/or second camera component 134).

Figure 1C:
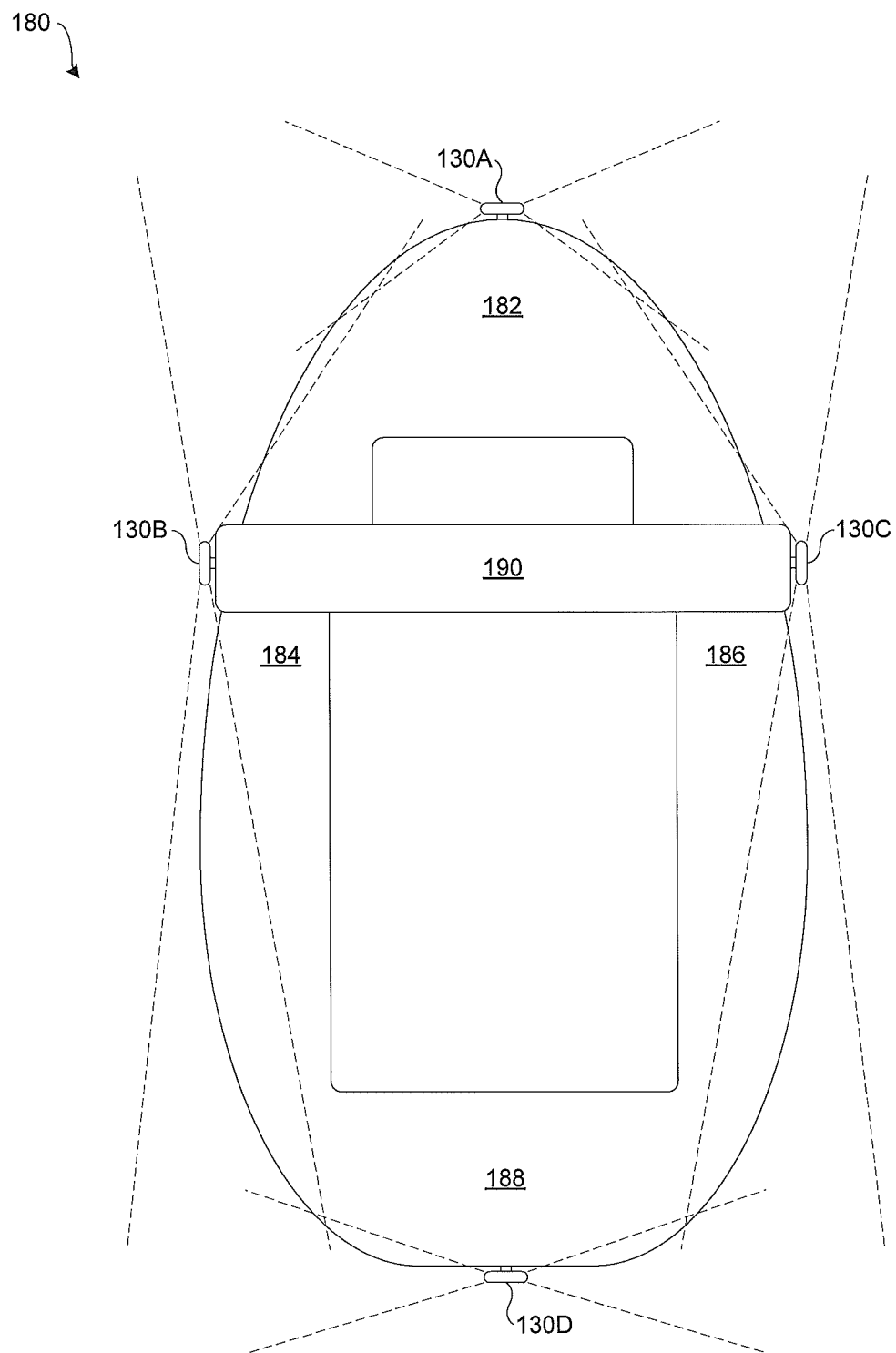
FIGS. 1C-1D show block diagrams illustrating various configurations for the infrared imaging systems of FIG. 1B, in accordance with various embodiments of the present disclosure.

FIG. 1C shows a top-view of infrared imaging system 100B having a plurality of image capture components 130A-130D (e.g., infrared cameras) mounted to a watercraft 180 in accordance with an embodiment of the present disclosure. In various implementations, image capture components 130A-130D may comprise any type of infrared camera (e.g., infrared detector device) adapted to capture one or more infrared images. Watercraft 180 may represent any type of watercraft (e.g., a boat, yacht, ship, cruise ship, tanker, commercial vessel, military vessel, etc.).

As shown in FIG. 1C, a plurality of image capture components 130A-130D may be mounted in a configuration at different positions on watercraft 180 in a manner so as to provide one or more fields of view around watercraft 180. In various implementations, an image capture component 130A may be mounted to provide a field of view ahead of or around a bow 182 (e.g., forward or fore part) of watercraft 180. As further shown, an image capture component 130B may be mounted to provide a field of view to the side of or around a port 184 (e.g., left side when facing bow 182) of watercraft 180. As further shown, an image capture component 130C may be mounted to provide a field of view to the side of or around a starboard 186 (e.g., right side when facing bow 182) of watercraft 180. As further shown, an image capture component 130D may be mounted to provide a field of view behind of or around a stem 188 (e.g., rear or aft part) of watercraft 180.

Thus, in one implementation, a plurality of infrared capture components 130A-130D (e.g., infrared cameras) may be mounted around the perimeter of watercraft 180 to provide fields of view thereabout. As an example, watercraft 180 may incorporate infrared imaging system 100B to provide man overboard detection, to assist during various modes of operation, such as night docking, night cruising, and/or day cruising of watercraft 180, and/or to provide various information, such as improved image clarity during hazy conditions or to provide a visual indication of the horizon and/or shoreline.

Figure 1D:
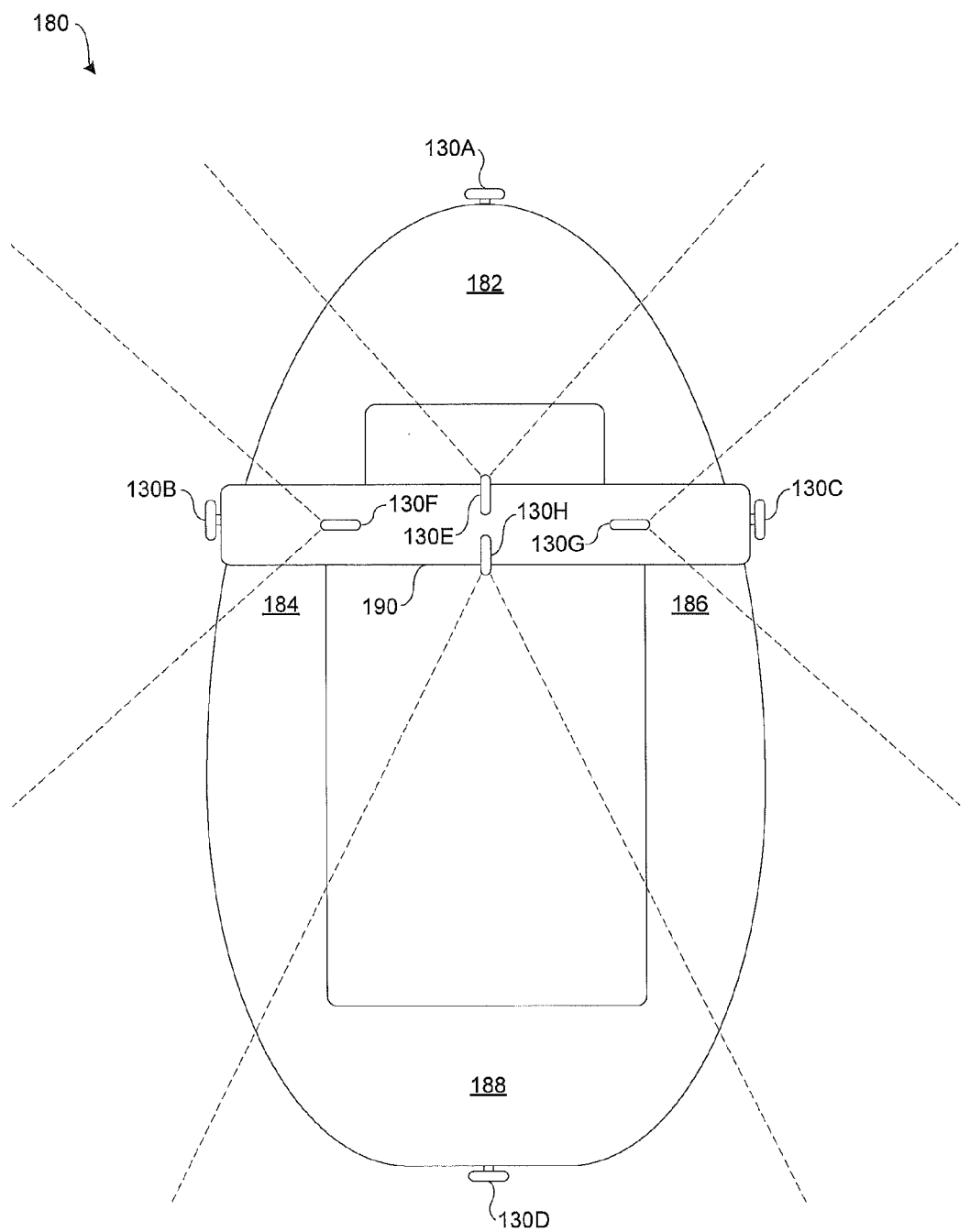

FIG. 1D shows a top-view of infrared imaging system 100B having a plurality of image capture components 130E-130H (e.g., infrared cameras) mounted to a control tower 190 (e.g., bridge) of watercraft 180 in accordance with an embodiment of the present disclosure. As shown in FIG. 1D, a plurality of image capture components 130E-130H may be mounted to control tower 190 in a configuration at different positions on watercraft 180 in a manner so as to provide one or more fields of view around watercraft 180. In various implementations, image capture component 130E may be mounted to provide a field of view of bow 182 of watercraft 180. As further shown, image capture component 130F may be mounted to provide a field of view of port 184 of watercraft 180. As further shown, image capture component 130G may be mounted to provide a field of view of starboard 186 of watercraft 180. As further shown, image capture component 130H may be mounted to provide a field of view of stem 188 of watercraft 180. Thus, in one implementation, a plurality of image capture components 130E-130H (e.g., infrared cameras) may be mounted around control tower 190 of watercraft 180 to provide fields of view thereabout. Furthermore as shown, image capture components 130B and 130C may also be mounted on control tower 190 of watercraft 180.

Figure 1E:
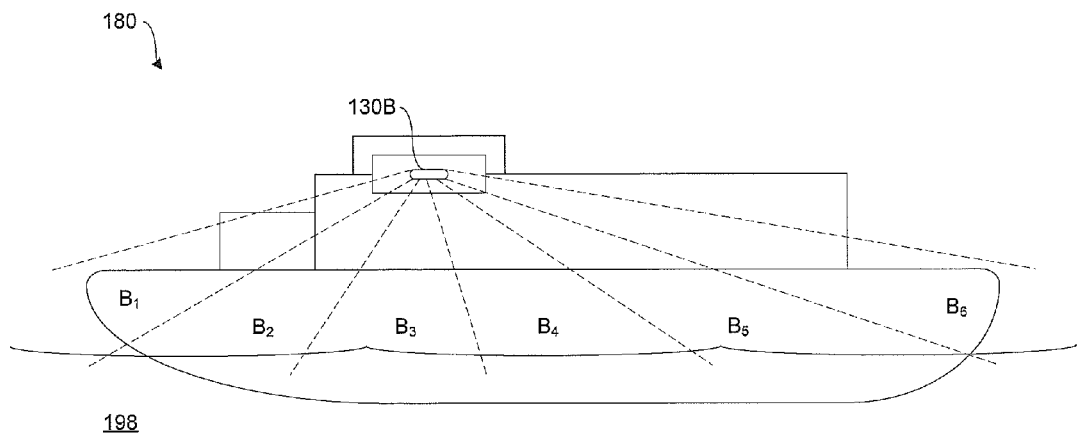
FIGS. 1E-1F show schematic diagrams illustrating a marine application of the infrared imaging systems of FIG. 1B, in accordance with various embodiments of the present disclosure.

FIG. 1E shows the port-side-view of infrared imaging system 100B having port-side image capture component 130B of FIG. 1B mounted to watercraft 180 in accordance with an embodiment of the present disclosure. In reference to FIG. 1E, image capture component 130B provides a port-side field of view around watercraft 180.

In one implementation, image capture component 130B may provide a field of view of a port-side image of watercraft 180. In another implementation, the port-side field of view may be segmented into a plurality of views $B_1$-$B_6$. For example, image capture component 130B may be adapted to provide one or more segmented narrow fields of view of the port-side field of view including one or more forward port-side views $B_1$-$B_3$ and one or more rearward port-side views $B_4$-$B_6$. In still another implementation, as shown in FIG. 6, image capture component 130B may comprise a plurality of image capture components 132 (and optionally a plurality of image capture components 134) to provide the plurality of segmented or narrowed fields of view $B_1$-$B_6$ within the overall port-side field of view of watercraft 180.

As further shown in FIG. 1E, the port-side fields of view $B_1$-$B_6$ of watercraft 180 may extend through a viewing range from image capture component 130B to a water surface 198 adjacent to watercraft 180. However, in various implementations, the viewing range may include a portion below the water surface 198 depending on the type of infrared detector utilized (e.g., type of infrared camera, desired wavelength or portion of the infrared spectrum, and other relevant factors as would be understood by one skilled in the art).

Figure 1F:
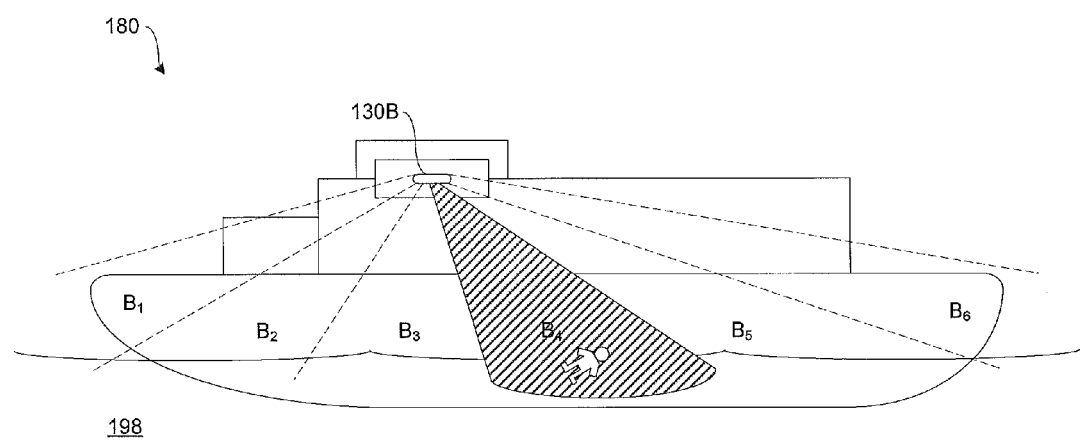

FIG. 1F shows an example of locating and identifying a man overboard within the port-side field of view of port-side image capture component 130B mounted to watercraft 180 in accordance with an embodiment of the present disclosure. In general, image capture component 130B may be used to identify and locate a man overboard (e.g., within the narrowed port-side field of view $B_3$) of watercraft 180. Once the man overboard is identified and located, processing component 110 of infrared imaging system 100B may control or provide information (e.g., slew-to-queue) to position a searchlight component 136 of FIG. 6 within the port-side field of view $B_3$ to aid in visual identification and rescue of the man overboard. It should be understood that searchlight component 136 may be separate from image capture component 130B (e.g., separate housing and/or control) or may be formed as part of image capture component 130B (e.g., within the same housing or enclosure).

Figure 2:
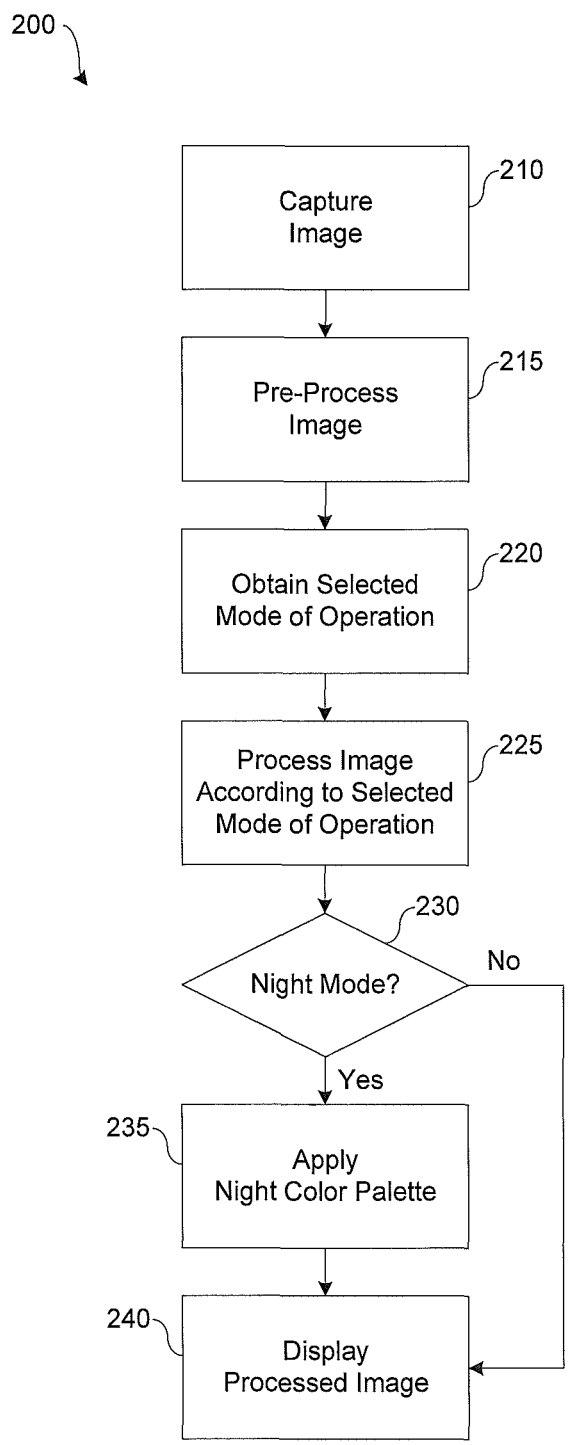
FIG. 2 shows a block diagram illustrating a method for capturing and processing infrared images, in accordance with an embodiment of the present disclosure.

FIG. 2 shows a method 200 for capturing and processing infrared images in accordance with an embodiment of the present disclosure. For purposes of simplifying discussion of FIG. 2, reference may be made to image capturing systems 100A, 100B of FIGS. 1A, 1B as an example of a system, device or apparatus that may perform method 200.

Referring to FIG. 2, an image (e.g., infrared image signal) is captured (block 210) with infrared imaging system 100A, 100B. In one implementation, processing component 110 induces (e.g., causes) image capture component 130 to capture an image, such as, for example, image 170. After receiving the captured image from image capture component 130, processing component 110 may optionally store the captured image in memory component 120 for processing.

Next, the captured image may optionally be pre-processed (block 215). In one implementation, pre-processing may include obtaining infrared sensor data related to the captured image, applying correction terms, and/or applying temporal noise reduction to improve image quality prior to further processing. In another implementation, processing component 110 may directly pre-process the captured image or optionally retrieve the captured image stored in memory component 120 and then pre-process the image. Pre-processed images may be optionally stored in memory component 120 for further processing.

Next, a selected mode of operation may be obtained (block 220). In one implementation, the selected mode of operation may comprise a user input control signal that may be obtained or received from control component 150 (e.g., control panel unit 500 of FIG. 5). In various implementations, the selected mode of operation may be selected from at least one of night docking, man overboard, night cruising, day cruising, hazy conditions, and shoreline mode. As such, processing component 110 may communicate with control component 150 to obtain the selected mode of operation as input by a user. These modes of operation are described in greater detail herein and may include the use of one or more infrared image processing algorithms.

In various implementations, modes of operation refer to preset processing and display functions for an infrared image, and infrared imagers and infrared cameras are adapted to process infrared sensor data prior to displaying the data to a user. In general, display algorithms attempt to present the scene (i.e., field of view) information in an effective way to the user. In some cases, infrared image processing algorithms are utilized to present a good image under a variety of conditions, and the infrared image processing algorithms provide the user with one or more options to tune parameters and run the camera in "manual mode". In one aspect, infrared imaging system 100A, 100B may be simplified by hiding advanced manual settings. In another aspect, the concept of preset image processing for different conditions may be implemented in maritime applications.

Next, referring to FIG. 2, the image is processed in accordance with the selected mode of operation (block 225), in a manner as described in greater detail herein. In one implementation, processing component 110 may store the processed image in memory component 120 for displaying. In another implementation, processing component 110 may retrieve the processed image stored in memory component 120 and display the processed image on display component 150 for viewing by a user.

Next, a determination is made as to whether to display the processed image in a night mode (block 230). If yes, then processing component 110 configures display component 140 to apply a night color palette to the processed image (block 235), and the processed image is displayed in night mode (block 240). For example, in night mode (e.g., for night docking, night cruising, or other modes when operating at night), an image may be displayed in a red palette or green palette to improve night vision capacity for a user. Otherwise, if night mode is not necessary, then the processed image is displayed in a non-night mode manner (e.g., black hot or white hot palette) (block 240).

In various implementations, the night mode of displaying images refers to using a red color palette or green color palette to assist the user or operator in the dark when adjusting to low light conditions. During night operation of image capturing system 100A, 100B, human visual capacity to see in the dark may be impaired by the blinding effect of a bright image on a display monitor. Hence, the night mode setting changes the color palette from a standard black hot or white hot palette to a red or green color palette display. In one aspect, the red or green color palette is generally known to interfere less with human night vision capacity. In one example, for a red-green-blue (RGB) type of display, the green and blue pixels may be disabled to boost the red color for a red color palette. In another implementation, the night mode display may be combined with any other mode of operation of infrared imaging system 100A, 100B, as described herein, and a default display mode of infrared imaging system 100A, 100B at night may be the night mode display.

Furthermore in various implementations, certain image features may be appropriately marked (e.g., color-indicated or colorized, highlighted, or identified with other indicia), such as during the image processing (block 225) or displaying of the processed image (block 240), to aid a user to identify these features while viewing the displayed image. For example, as discussed further herein, during a man overboard mode, a suspected person (e.g., or other warm-bodied animal or object) may be indicated in the displayed image with a blue color (or other color or type of marking) relative to the black and white palette or night color palette (e.g., red palette). As another example, as discussed further herein, during a nighttime or daytime cruising mode and/or hazy conditions mode, potential hazards in the water may be indicated in the displayed image with a yellow color (or other color or type of marking) to aid a user viewing the display. Further details regarding image colorization may be found, for example, in U.S. Pat. No. 6,849,849, which is assigned to Applicant, and which is thus incorporated herein by reference in its entirety.

In various implementations, processing component 110 may switch the processing mode of a captured image in real time and change the displayed processed image from one mode, corresponding to mode modules 112A-112N, to a different mode upon receiving user input from control component 150. As such, processing component 110 may switch a current mode of display to a different mode of display for viewing the processed image by the user or operator on display component 140. This switching may be referred to as applying the infrared camera processing techniques of mode modules 112A-112N for real time applications, wherein a user or operator may change the displayed mode while viewing an image on display component 140 based on user input to control component 150.

FIGS. 3A-3E show block diagrams illustrating infrared processing techniques in accordance with various embodiments of the present disclosure. As described herein, infrared imaging system 100A, 100B is adapted to switch between different modes of operation so as to improve the infrared images and information provided to a user or operator.

Figures 3A, 3B:
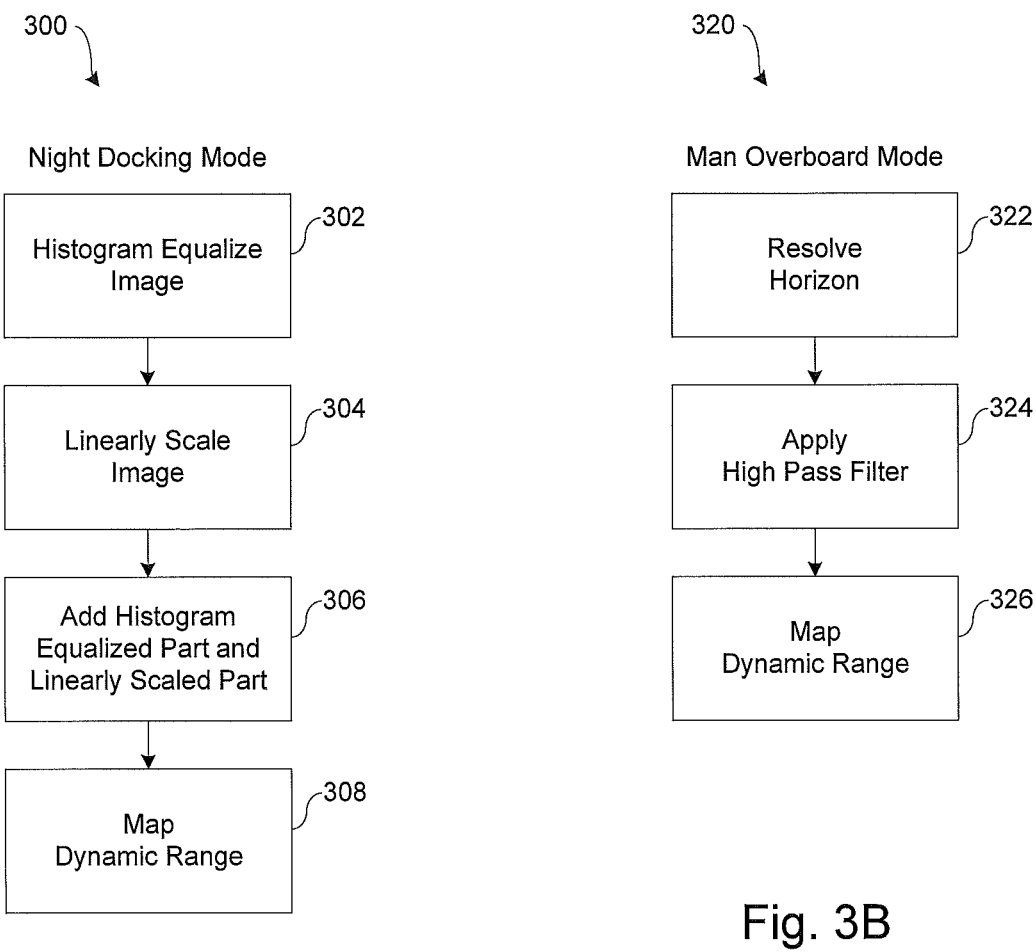

FIG. 3A shows one embodiment of an infrared processing technique 300 as described in reference to block 225 of FIG. 2. In one implementation, the infrared processing technique 300 comprises a night docking mode of operation for maritime applications. For example, during night docking, a watercraft or sea vessel is in the vicinity of a harbor, jetty or marina, each of which having proximate structures including piers, buoys, other watercraft, other structures on land. A thermal infrared imager (e.g., infrared imaging system 100A, 100B) may be used as a navigational tool in finding a correct docking spot. The infrared imaging system 100A, 100B produces an infrared image that assists the user or operator in docking the watercraft. There is a high likelihood of hotspots in the image, such as dock lights, vents and running motors, which may have a minimal impact on how the scene is displayed.

Referring to FIG. 3A, the input image is histogram equalized and scaled (e.g., 0-511) to form a histogram equalized part (block 302). Next, the input image is linearly scaled (e.g., 0-128) while saturating the highest and lowest parts or proportions (e.g., 1%) to form a linearly scaled part (block 304). Next, the histogram-equalized part and the linearly scaled part are added together to form an output image (block 306). Next, the dynamic range of the output image is linearly mapped to fit the display component 140 (block 308). It should be appreciated that the block order in which the process 300 is executed may be executed in a different order without departing from the scope of the present disclosure.

In one embodiment, the night docking mode is intended for image settings with large amounts of thermal clutter, such as a harbor, a port, or an anchorage. The settings may allow the user to view the scene without blooming on hot objects. Hence, infrared processing technique 300 for the night docking mode is useful for situational awareness in maritime applications when, for example, docking a watercraft with low visibility.

In various implementations, during processing of an image when the night docking mode is selected, the image is histogram equalized to compress the dynamic range by removing "holes" in the histogram. The histogram may be plateau limited so that large uniform areas, such as sky or water components, are not given too much contrast. For example, approximately 20% of the dynamic range of the output image may be preserved for a straight linear mapping of the non-histogram equalized image. In the linear mapping, for example, the lowest 1% of the pixel values are mapped to zero and the highest 1% of the input pixels are mapped to a maximum value of the display range (e.g., 235). In one aspect, the final output image becomes a weighted sum of the histogram equalized and linearly (with 1% "outlier" cropping) mapped images.

FIG. 3B shows one embodiment of an infrared processing technique 320 as described in reference to block 225 of FIG. 2. In one implementation, the infrared processing technique 320 comprises a man overboard mode of operation for maritime applications. For example, in the man overboard mode, image capturing system 100A, 100B may be tuned to the specific task of finding a person in the water. The distance between the person in the water and the watercraft may not be known, and the person may be only a few pixels in diameter or significantly larger if lying close to the watercraft. In one aspect, even though a person may be close to the watercraft, the person may have enough thermal signature to be clearly visible, and thus the man overboard display mode may target the case where the person has weak thermal contrast and is far enough away so as to not be clearly visible without the aid of image capturing system 100A, 100B.

Referring to FIG. 3B, image capture component 130 (e.g., infrared camera) of image capturing system 100A, 100B is positioned to resolve or identify the horizon (block 322). In one implementation, the infrared camera is positioned so that the horizon is at an upper part of the field of view (FoV). In another implementation, the shoreline may also be indicated along with the horizon. Next, a high pass filter (HPF) is applied to the image to form an output image (block 324). Next, the dynamic range of the output image is linearly mapped to fit the display component 140 (block 326). It should be appreciated that the block order in which the process 320 is executed may be executed in a different order without departing from the scope of the present disclosure.

In one example, horizon identification may include shoreline identification, and the horizon and/or shoreline may be indicated by a line (e.g., a red line or other indicia) superimposed on a thermal image along the horizon and/or the shoreline. Such indication may be useful for user or operators to determine position of the watercraft in relation to the shoreline. Horizon and/or shoreline identification may be accomplished by utilizing a real-time Hough transform or other equivalent type of transform applied to the image stream, wherein this image processing transform finds linear regions (e.g., lines) in an image. The real-time Hough transform may also be used to find the horizon and/or shoreline in open ocean when, for example, the contrast may be low. Under clear conditions, the horizon and/or shoreline may be easy identified. However, on a hazy day, the horizon and/or shoreline may be difficult to locate.

In general, knowing where the horizon and/or shoreline are is useful for situational awareness. As such, in various implementations, the Hough transform may be allied to any of the modes of operation described herein to identify the horizon and/or shoreline in an image. For example, the shoreline identification (e.g., horizon and/or shoreline) may be included along with any of the processing modes to provide a line (e.g., any type of marker, such as a red line or other indicia) on the displayed image and/or the information may be used to position the infrared camera's field of view.

In one embodiment of the man overboard mode, signal gain may be increased to bring out minute temperature differences of the ocean, such as encountered when looking for a hypothermic body in a uniform ocean temperature that may be close to the person's body temperature. Image quality is traded for the ability to detect small temperature changes when comparing a human body to ocean temperature. Thus, infrared processing technique 320 for the man overboard mode is useful for situational awareness in maritime applications when, for example, searching for a man overboard proximate to the watercraft.

In various implementations, during processing of an image when the man overboard mode is selected, a high pass filter is applied to the image. For example, the signal from the convolution of the image by a Gaussian kernel may be subtracted. The remaining high pass information is linearly stretched to fit the display range, which may increase the contrast of any small object in the water. In one enhancement of the man overboard mode, objects in the water may be marked, and the system signals the watercraft to direct a searchlight at the object. For systems with both visible and thermal imagers, the thermal imager is displayed. For zoom or multi-FoV systems, the system is set in a wide FoV. For pan-tilt controlled systems with stored elevation settings for the horizon, the system is moved so that the horizon is visible just below the upper limit of the field of view.

In one embodiment, the man overboard mode may activate a locate procedure to identify an area of interest, zoom-in on the area of interest, and position a searchlight on the area of interest. For example, the man overboard mode may activate a locate procedure to identify a position of a object (e.g., a person) in the water, zoom-in the infrared imaging device (e.g., an infrared camera) on the identified object in the water, and then point a searchlight on the identified object in the water. In another embodiment, the man overboard mode may be adapted to maintain tracking of an area of interest as the surveillance craft moves relative to the region of interest and/or the region of interest drifts relative to the surveillance craft. In various implementations, these actions may be added to process 200 of FIG. 2 and/or process 320 of FIG. 3B and further be adapted to occur automatically so that the area of interest and/or location of the object of interest may be quickly identified and retrieved by a crew member.

FIG. 3C shows one embodiment of an infrared processing technique 340 as described in reference to block 225 of FIG. 2. In one implementation, the infrared processing technique 340 comprises a night cruising mode of operation for maritime applications. For example, during night cruising, the visible channel has limited use for other than artificially illuminated objects, such as other watercraft. The thermal infrared imager may be used to penetrate the darkness and assist in the identification of buoys, rocks, other watercraft, islands and structures on shore. The thermal infrared imager may also find semi-submerged obstacles that potentially lie directly in the course of the watercraft. In the night cruising mode, the display algorithm may be tuned to find objects in the water without distorting the scene (i.e., field of view) to the extent that it becomes useless for navigation.

In one embodiment, the night cruising mode is intended for low contrast situations encountered on an open ocean. The scene (i.e., field of view) may be filled with a uniform temperature ocean, and any navigational aids or floating debris may sharply contrast with the uniform temperature of the ocean. Therefore, infrared processing technique 340 for the night cruising mode is useful for situational awareness in, for example, the open ocean.

Referring to FIG. 3C, the image is separated into a background image part and a detailed image part (block 342). Next, the background image part is histogram equalized (block 344) and scaled (e.g., 0-450) (block 346). Next, the detailed image part is scaled (e.g., 0-511) (block 348). Next, the histogram-equalized background image part and the scaled detailed image part are added together to form an output image (block 350). Next, the dynamic range of the output image is linearly mapped to fit the display component 140 (block 352). It should be appreciated that the block order in which the process 340 is executed may be executed in a different order without departing from the scope of the present disclosure.

In various implementations, during processing of an image when the night cruising mode is selected, the input image is split into detailed and background image components using a non-linear edge preserving low pass filter (LPF), such as a median filter or by anisotropic diffusion. The background image component comprises a low pass component, and the detailed image part is extracted by subtracting the background image part from the input image. To enhance the contrast of small and potentially weak objects (e.g., with potentially weak thermal signatures), the detailed and background image components may be scaled so that the details are given approximately 60% of the output/display dynamic range. In one enhancement of the night cruising mode, objects in the water are tracked, and if they are on direct collision course with the current watercraft course, then they are marked in the image, and an audible and/or visual alarm may be sounded and/or displayed, respectively. In some implementations, for systems with both visible and thermal imagers, the thermal imager may be displayed by default.

In one embodiment, a first part of the image signal may include a background image part comprising a low spatial frequency high amplitude portion of an image. In one example, a low pass filter (e.g., low pass filter algorithm) may be utilized to isolate the low spatial frequency high amplitude portion of the image signal (e.g., infrared image signal). In another embodiment, a second part of the image signal may include a detailed image part comprising a high spatial frequency low amplitude portion of an image. In one example, a high pass filter (e.g., high pass filter algorithm) may be utilized to isolate the high spatial frequency low amplitude portion of the image signal (e.g., infrared image signal). Alternately, the second part may be derived from the image signal and the first part of the image signal, such as by subtracting the first part from the image signal.

In general for example, the two image parts (e.g., first and second parts) of the image signal may be separately scaled before merging the two image parts to produce an output image. For example, the first or second parts may be scaled or both the first and second parts may be scaled. In one aspect, this may allow the system to output an image where fine details are visible and tunable even in a high dynamic range scene. In some instances, as an example, if an image appears less useful or degraded by some degree due to noise, then one of the parts of the image, such as the detailed part, may be suppressed rather than amplified to suppress the noise in the merged image to improve image quality.

FIG. 3D shows one embodiment of an infrared processing technique 360 as described in reference to block 225 of FIG. 2. In one implementation, the infrared processing technique 360 comprises a day cruising mode of operation for maritime applications. For example, during day cruising, the user or operator may rely on human vision for orientation immediately around the watercraft. Image capturing system 100A, 100B may be used to zoom in on objects of interest, which may involve reading the names of other watercraft, and searching for buoys, structures on land, etc.

Referring to FIG. 3D, the image is separated into a background image part and a detailed image part (block 362). Next, the background image part is histogram equalized (block 364) and scaled (e.g., 0-511) (block 366). Next, the detailed image part is scaled 0-255 (block 368). Next, the histogram-equalized background image part and the scaled detailed image part are added together to form an output image (block 370). Next, the dynamic range of the output image is linearly mapped to fit the display component 140 (block 372). It should be appreciated that the block order in which the process 360 is executed may be executed in a different order without departing from the scope of the present disclosure.

In one embodiment, the day cruising mode is intended for higher contrast situations, such as when solar heating leads to greater temperature differences between unsubmerged or partially submerged objects and the ocean temperature. Hence, infrared processing technique 360 for the day cruising mode is useful for situational awareness in, for example, high contrast situations in maritime applications.

In various implementations, during processing of an image when the day cruising mode is selected, the input image is split into its detailed and background components respectively using a non-linear edge preserving low pass filter, such as a median filter or by anisotropic diffusion. For color images, this operation may be achieved on the intensity part of the image (e.g., Y in a YCrCb format). The background image part comprises the low pass component, and the detailed image part may be extracted by subtracting the background image part from the input image. To enhance the contrast of small and potentially weak objects (e.g., with potentially weak thermal signatures), the detailed and background image parts may be scaled so that the details are given approximately 35% of the output/display dynamic range. For systems with both visible and thermal imagers the visible image may be displayed by default.

Figures 3E, 3F:
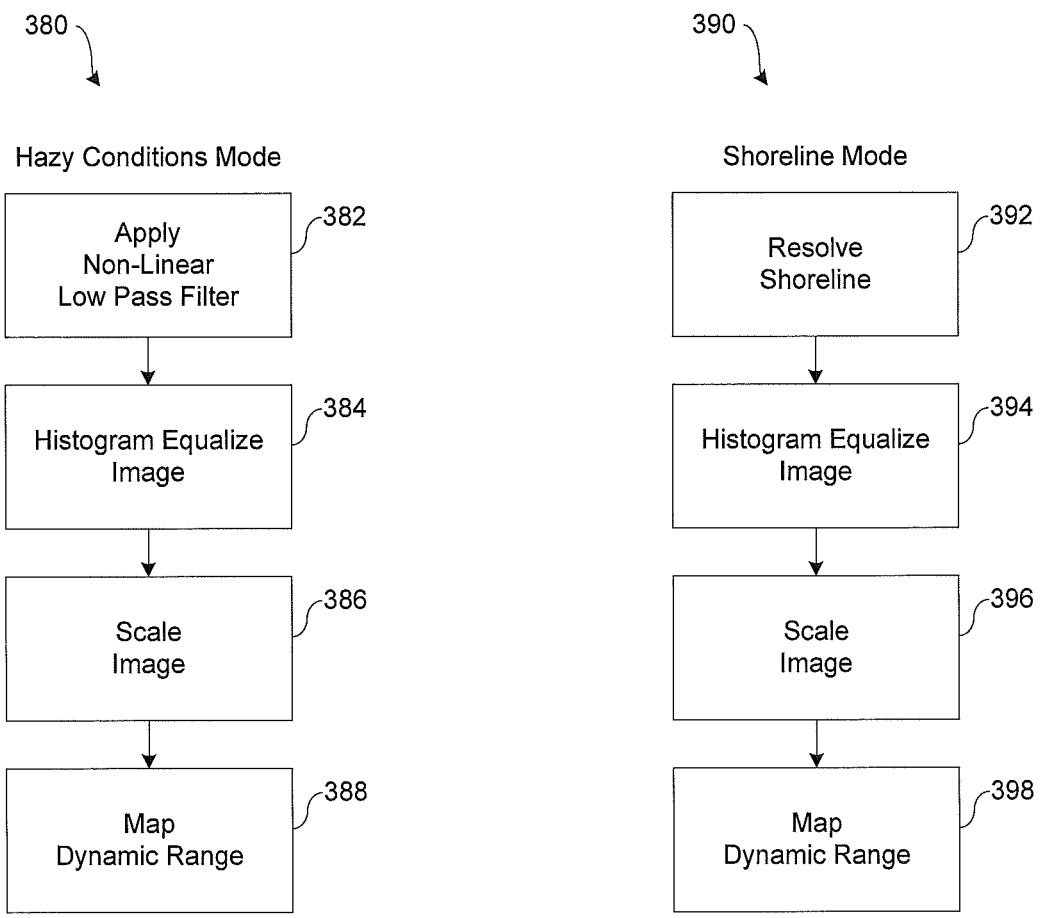

FIG. 3E shows one embodiment of an infrared processing technique 380 as described in reference to block 225 of FIG. 2. In one implementation, the infrared processing technique 380 comprises a hazy conditions mode of operation for maritime applications. For example, even during daytime operation, a user or operator may achieve better performance from an imager using an infrared (MWIR, LWIR) or near infrared (NIR) wave band. Depending on vapor content and particle size, a thermal infrared imager may significantly improve visibility under hazy conditions. If neither the visible nor the thermal imagers penetrate the haze, image capturing system 100A, 100B may be set in hazy conditions mode under which system 100A, 100B attempts to extract what little information is available from the chosen infrared sensor. Under hazy conditions, there may be little high spatial frequency information (e.g., mainly due, in one aspect, to scattering by particles). The information in the image may be obtained from the low frequency part of the image, and boosting the higher frequencies may drown the image in noise (e.g., temporal and/or fixed pattern).

Referring to FIG. 3E, a non-linear edge preserving low pass filter (LPF) is applied to the image (block 382). Next, the image is histogram equalized (block 384) and scaled (block 386) to form a histogram equalized output image. Next, the dynamic range of the output image is linearly mapped to fit the display component 140 (block 388). It should be appreciated that the block order in which the process 380 is executed may be executed in a different order without departing from the scope of the present disclosure.

In various implementations, during processing of an image when the hazy conditions mode is selected, a non-linear, edge preserving, low pass filter, such as median or by anisotropic diffusion is applied to the image (i.e., either from the thermal imager or the intensity component of the visible color image). In one aspect, the output from the low pass filter operation may be histogram equalized and scaled to map the dynamic range to the display and to maximize contrast of the display.

FIG. 3F shows one embodiment of an infrared processing technique 390 as described in reference to block 225 of FIG. 2. In one implementation, the infrared processing technique 390 comprises a shoreline mode of operation for maritime applications.

Referring to FIG. 3F, the shoreline may be resolved (block 392). For example, shoreline identification (e.g., horizon and/or shoreline) may be determined by applying an image processing transform (e.g., a Hough transform) to the image (block 392), which may be used to position the infrared camera's field of view and/or to provide a line (e.g., any type of marker, such as a red line(s) or other indicia on the displayed image. Next, the image is histogram equalized (block 394) and scaled (block 396) to form an output image. Next, the dynamic range of the output image is linearly mapped to fit the display component 140 (block 398). It should be appreciated that the block order in which the process 390 is executed may be executed in a different order without departing from the scope of the present disclosure.

In one implementation, the information produced by the transform (e.g., Hough transform) may be used to identify the shoreline or even the horizon as a linear region for display. The transform may be applied to the image in a path separate from the main video path (e.g., the transform when applied does not alter the image data and does not affect the later image processing operations), and the application of the transform may be used to detect linear regions, such as straight lines (e.g., of the shoreline and/or horizon). In one aspect, by assuming the shoreline and/or horizon comprises a straight line stretching the entire width of the frame, the shoreline and/or horizon may be identified as a peak in the transform and may be used to maintain the field of view in a position with reference to the shoreline and/or horizon. As such, the input image (e.g., preprocessed image) may be histogram equalized (block 394) and scaled (block 396) to generate an output image, and then the transform information (block 392) may be added to the output image to highlight the shoreline and/or horizon of the displayed image.

Moreover, in the shoreline mode of operation, the image may be dominated by sea (i.e., lower part of image) and sky (i.e., upper part of image), which may appear as two peaks in the image histogram. In one aspect, significant contrast is desired over the narrow band of shoreline, and a low number (e.g., relatively based on the number of sensor pixels and the number of bins used in the histogram) may be selected for the plateau limit for the histogram equalization. In one aspect, for example, a low plateau limit (relative) may reduce the effect of peaks in the histogram and give less contrast to sea and sky while preserving contrast for the shoreline and/or horizon regions.

FIG. 4 shows a block diagram illustrating a method 400 of implementing modes 410A-410E and infrared processing techniques related thereto, as described in reference to various embodiments of the present disclosure. In particular, a first mode refers to night docking mode 410A, a second mode refers to man overboard mode 410B, a third mode refers to night cruising mode 410C, a fourth mode refers to day cruising mode 410D, and a fifth mode refers to hazy conditions mode 410E.

In one implementation, referring to FIG. 4, processing component 110 of image capturing system 100A, 100B of FIGS. 1A, 1B may perform method 400 as follows. Sensor data (i.e., infrared image data) of a captured image is received or obtained (block 402). Correction terms are applied to the received sensor data (block 404), and temporal noise reduction is applied to the received sensor data (block 406).

Next, at least one of the selected modes 410A-410E may be selected by a user or operator via control component 150 of image capturing system 100A, 100B, and processing component 110 executes the corresponding processing technique associated with the selected mode of operation. In one example, if night docking mode 410A is selected, then the sensor data may be histogram equalized and scaled (e.g., 0-511) (block 420), the sensor data may be linearly scaled (e.g., 0-128) saturating the highest and lowest (e.g., 1%) (block 422), and the histogram equalized sensor data is added to the linearly scaled sensor data for linearly mapping the dynamic range to display component 140 (block 424). In another example, if man overboard mode 410B is selected, then infrared capturing component 130 of image capturing system 100A, 100B may be moved or positioned so that the horizon is at an upper part of the field of view (FoV), a high pass filter (HPF) is applied to the sensor data (block 432), and the dynamic range of the high pass filtered sensor data is then linearly mapped to fit display component 140 (block 434). In another example, if night cruising mode 410C is selected, the sensor data is processed to extract a faint detailed part and a background part with a high pass filter (block 440), the background part is histogram equalized and scaled (e.g., 0-450) (block 442), the detailed part is scaled (e.g., 0-511) (block 444), and the background part is added to the detailed part for linearly mapping the dynamic range to display component 140 (block 446). In another example, if day cruising mode 410D is selected, the sensor data is processed to extract a faint detailed part and a background part with a high pass filter (block 450), the background part is histogram equalized and scaled (e.g., 0-511) (block 452), the detailed part is scaled 0-255 (block 454), and the background part is added to the detailed part for linearly mapping the dynamic range to display component 140 (block 456). In still another example, if hazy condition mode 410E is selected, then a non-linear low pass filter (e.g., median) is applied to the sensor data (block 460), which is then histogram equalized and scaled for linearly mapping the dynamic range to display component 140 (block 462).

For any of the modes (e.g., blocks 410A-410E), the image data for display may be marked (e.g., color coded, highlighted, or otherwise identified with indicia) to identify, for example, a suspected person in the water (e.g., for man overboard) or a hazard in the water (e.g., for nighttime cruising, daytime cruising, or any of the other modes). For example, image processing algorithms may be applied (block 470) to the image data to identify various features (e.g., objects, such as a warm-bodied person, water hazard, horizon, or shoreline) in the image data and appropriately mark these features to assist in recognition and identification by a user viewing the display. As a specific example, a suspected person in the water may be colored blue, while a water hazard (e.g., floating debris) may be colored yellow in the displayed image.

Furthermore for any of the modes (e.g., blocks 410A-410E), the image data for display may be marked to identify, for example, the shoreline (e.g., shoreline and/or horizon). For example, image processing algorithms may be applied (block 475) to the image data to identify the shoreline and/or horizon and appropriately mark these features to assist in recognition and identification by a user viewing the display. As a specific example, the horizon and/or shoreline may be outlined or identified with red lines on the displayed image to aid the user viewing the displayed image.

Next, after applying at least one of the infrared processing techniques for modes 410A-410E, a determination is made as to whether to display the processed sensor data in night mode (i.e., apply the night color palette) (block 480). If yes, then the night color palette is applied to the processed sensor data (block 482), and the processed sensor data is displayed in night mode (block 484). If no, then the processed sensor data is displayed in a non-night mode manner (e.g., black hot or white hot palette) (block 484). It should be appreciated that, in night mode, sensor data (i.e., image data) may be displayed in a red or green color palette to improve night vision capacity for a user or operator.

FIG. 5 shows a block diagram illustrating one embodiment of control component 150 of infrared imaging system 100A, 100B for selecting between different modes of operation, as previously described in reference to FIGS. 2-4. In one embodiment, control component 150 of infrared imaging system 100A, 100B may comprise a user input and/or interface device, such as control panel unit 500 (e.g., a wired or wireless handheld control unit) having one or more push buttons 510, 520, 530, 540, 550, 560, 570 adapted to interface with a user and receive user input control values and further adapted to generate and transmit one or more input control signals to processing component 100A, 100B. In various other embodiments, control panel unit 500 may comprise a slide bar, rotatable knob to select the desired mode, keyboard, etc., without departing from the scope of the present disclosure.

In various implementations, a plurality of push buttons 510, 520, 530, 540, 550, 560, 570 of control panel unit 500 may be utilized to select between various modes of operation as previously described in reference to FIGS. 2-4. In various implementations, processing component 110 may be adapted to sense control input signals from control panel unit 500 and respond to any sensed control input signals received from push buttons 510, 520, 530, 540, 550, 560, 570. Processing component 110 may be further adapted to interpret the control input signals as values. In various other implementations, it should be appreciated that control panel unit 500 may be adapted to include one or more other push buttons (not shown) to provide various other control functions of infrared imaging system 100A, 100B, such as auto-focus, menu enable and selection, field of view (FoV), brightness, contrast, and/or various other features. In another embodiment, control panel unit 500 may comprise a single push button, which may be used to select each of the modes of operation 510, 520, 530, 540, 550, 560, 570.

In another embodiment, control panel unit 500 may be adapted to be integrated as part of display component 140 to function as both a user input device and a display device, such as, for example, a user activated touch screen device adapted to receive input signals from a user touching different parts of the display screen. As such, the GUI interface device may have one or more images of, for example, push buttons 510, 520, 530, 540, 550, 560, 570 adapted to interface with a user and receive user input control values via the touch screen of display component 140.

In one embodiment, referring to FIG. 5, a first push button 510 may be enabled to select the night docking mode of operation, a second push button 520 may be enabled to select the man overboard mode of operation, a third push button 530 may be enabled to select the night cruising mode of operation, a fourth push button 540 may be enabled to select the day cruising mode of operation, a fifth push button 550 may be enabled to select the hazy conditions mode of operation, a sixth push button 560 may be enabled to select the shoreline mode of operation, and a seventh push button 570 may be enabled to select or turn the night display mode (i.e., night color palette) off. In another embodiment, a single push button for control panel unit 500 may be used to toggle t each of the modes of operation 510, 520, 530, 540, 550, 560, 570 without departing from the scope of the present disclosure.

FIG. 6 shows a schematic diagram illustrating an embodiment of image capture component 130 of infrared imaging system 100A, 100B. As shown, image capture component 130 may be adapted to comprise a first camera component 132, a second camera component 134, and/or a searchlight component 136. In various implementations, each of the components 132, 134, 136 may be integrated as part of image capture component 130 or one or more of the components 132, 134, 136 may be separate from image capture component 130 without departing from the scope of the present disclosure.

In one embodiment, first camera component 132 may comprise an infrared camera component capable of capturing infrared image data of image 170. In general, an infrared camera is a device that is adapted to form an image using infrared radiation, which may be useful for rescue operations in water and/or darkness.

In one embodiment, second camera component 134 may comprise another infrared camera component or a camera capable of capturing visible spectrum images of image 170. In general, a visible-wavelength camera may be used by a crew member of watercraft 180 to view and examine the image 170. For example, in daylight, the visible-wavelength camera may assist with viewing, identifying, and locating a man overboard.

In various implementations, the camera components 132, 134 may be adapted to include a wide and/or narrow field of view (e.g., a fixed or variable field of view). For example, this feature may include a telescoping lens that narrows the field of view to focus on a particular area within the field of view.

In one embodiment, searchlight component 136 comprises a device capable of projecting a beam of light towards image 170 in the field of view. In one implementation, searchlight component 136 is adapted to focus a beam of light on a target within the field of view of at least one of camera components 132, 134 so as to identify and locate, for example, a position of a man overboard, which would allow a crew member of watercraft 180 to have improved visibility of the man overboard in darkness.

Figure 7:
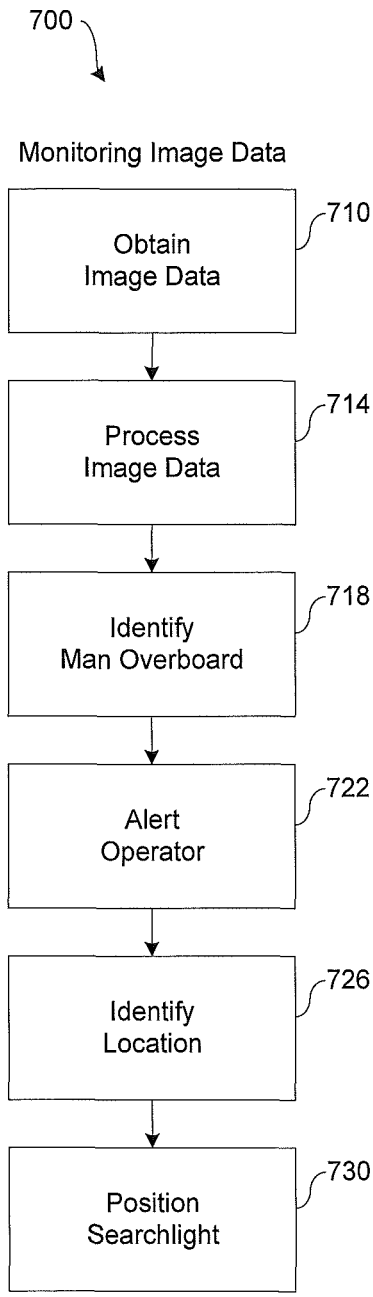
FIG. 7 shows a block diagram illustrating an embodiment of a method for monitoring image data of the infrared imaging systems, in accordance with an embodiment of the present disclosure.

FIG. 7 shows a block diagram illustrating an embodiment of a method 700 for monitoring image data of infrared imaging system 100A, 100B. In one implementation, method 700 is performed by processing component 110 of infrared imaging system 100A, 100B. As shown in FIG. 7, image data is obtained (block 710). In various implementations, the image data may be obtained directly from the image capture component 130 or from storage in memory component 120.

Next, the obtained image data may be processed (block 714). In one implementation, the obtained image data may be processed using the man overboard mode of operation 320 of FIG. 3B to collect image data to detect an object, such as a person, falling into or in the water proximate to watercraft 180.

Next, a man overboard (e.g., person) may be identified from the processed image data (block 718). In one implementation, the object (e.g., a person) may be separated from the water based on the temperature difference therebetween. For example, when a person having a body temperature of approximately 98 degrees falls into the water having a water temperature of approximately 60-70 degrees or less, the difference between the temperatures is viewable with an infrared image, and therefore, the person may be quickly identified and located in the water.

In an example embodiment, various types of conventional image processing software (e.g., a software package by ObjectVideo located in Reston, Va.) may be run by processing component 110 to perform image analysis to monitor the image data and detect a man overboard condition. In an example embodiment, features in such conventional software may support the use of threshold conditions or object discrimination, for example, to distinguish non-living objects, such as a deck chair or other inanimate objects, from a person. Programming the software package with threshold factors such as temperature, shape, size, aspect ratio, velocity, or other factors may assist a software package in discriminating images of non-living and/or non-human objects from images of humans. Thus, threshold conditions for use as desired in a given application may provide that a bird flying through a camera's field of view, for example, may be ignored, as would a falling deck chair or cup of hot coffee thrown overboard.

When a man overboard condition is suspected or determined, an operator (e.g., crew member) may be alerted or notified (block 722) so that a rescue action may be initiated. In various implementations, this alert or notification may comprise an audio signal and/or visual signal, such as an alarm, a warning light, a siren, a bell, a buzzer, etc.

Next, the specific location of the man overboard may be identified based on the image data (block 726). In one implementation, identifying the location of the person may include narrowing the field of view of the image capture component 130. For example, a lens of the infrared camera may telescope to a position to zoom-in on the object or person in the water or zoom-in on at least the proximate location of the person in the water or another narrower field of view image capture component 130 may be directed to the proximate location of the person in the water. Furthermore, a searchlight (e.g., searchlight component 136 of the image capture component 130) may be directed to the proximate location of the person in the water (block 730) to assist with the retrieval and rescue of the person overboard.

When a man overboard condition is detected, for example in accordance with an embodiment, the time and/or location of the event may be recorded along with the image data (e.g., as part of block 722 or 726), so as to aid in the search and rescue operation and/or to provide information for later analysis of the suspected man overboard event. Alternatively, the time and/or location may be regularly recorded with the image data. For example, processing component 110 (FIGS. 1a, 1b) may include a location determination function (e.g., a global positioning system (GPS) receiver or by other conventional location determination techniques) to receive precise location and/or time information, which may be stored (e.g., in memory component 120) along with the image data. The image data along with the location information and/or time information may then be used, for example, to allow a search and rescue crew to leave the ship (e.g., cruise ship) and backtrack in a smaller vessel or helicopter to the exact location of the man overboard condition in a prompt fashion as a large ship generally would not be able to quickly stop and return to the location of the man overboard event.

In accordance with embodiments of the present disclosure, operators may utilize an enhanced vision system (EVS) to pilot and/or navigate vehicles (e.g., land-based vehicles including automobiles, air-based vehicles including aircraft, and water-based vehicles including watercraft) in varying environmental conditions. For example, an EVS may utilize multiple sensors including at least one sensor sensitive to visible light (e.g., an optical sensor) to provide viewable images in ambient light and at least one sensor sensitive to infrared radiation (e.g., IR sensors) to provide viewable images in darkness. In circumstances where visible light sources exist (e.g., airport lights, tower lights, buoy lights, street lights, etc.), it may be desirable for the operator to see those visible light sources, wherein a sensor sensitive to the visible light spectrum is able to image visible light sources. In circumstances where visible light sources exist but have relatively invisible structural features when viewed in darkness, it may be desirable for the operator to see those structural features, wherein a sensor sensitive to the infrared spectrum is capable of imaging relatively invisible heat sources of structural features. In accordance with one or more embodiments of the present disclosure, the systems 100A, 100B of FIGS. 1A, 1B may be adapted to have enhanced vision capability for combining images of visible and infrared wavelength sensors. In one aspect, combining or blending image signals from dual sensors (e.g., combining image signals from a visible sensor with image signals from an infrared sensor) may be utilized to generate combined or blended image signals that retain, e.g., color information from the visible sensor and shows, e.g., infrared luminance (e.g., irradiation) from the infrared sensor. In another aspect, three different types of image display modes may be provided by such a system, such as a visible only mode, an infrared only mode, and a combined or blended mode.

Figure 8:
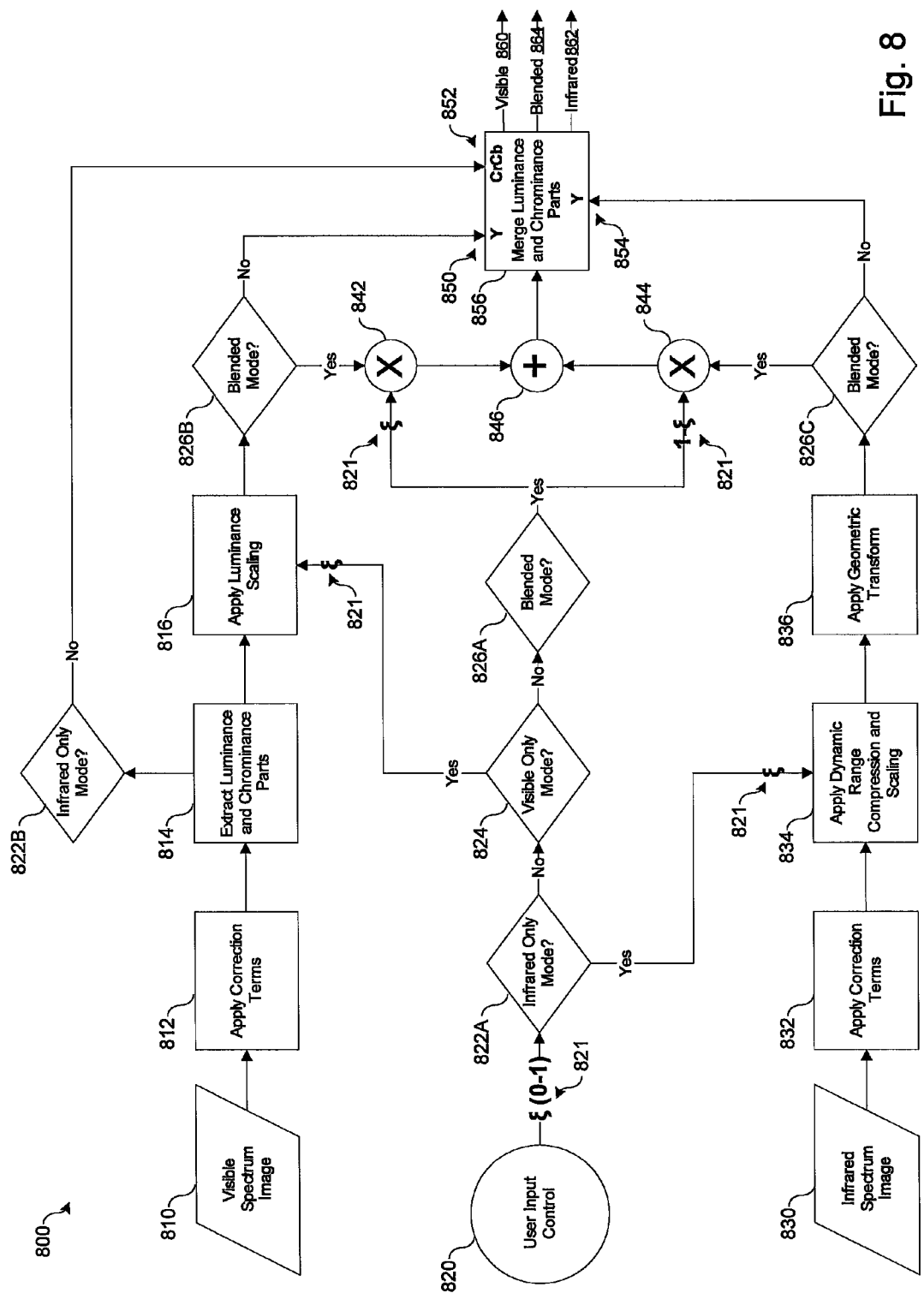
FIG. 8 shows a block diagram of a method for implementing dual sensor applications in an enhanced vision system, in accordance with embodiments of the present disclosure.

FIG. 8 shows one embodiment of a block diagram of a method 800 for implementing dual sensor applications in an enhanced vision system. As shown in FIG. 8, a plurality of signal paths (e.g., video signal paths) may be utilized in an enhanced vision system, such as system 100A of FIG. 1A and/or system 100B of FIG. 1B adapted to have enhanced vision capability. The enhanced vision systems 100A, 100B may be adapted to operate in at least one of three modes, such as a first mode (i.e., mode 1) with color or monochrome imagery from a visible light sensor, a second mode (i.e., mode 2) with monochrome or pseudo color imagery from an infrared sensor, and a third mode (i.e., mode 3) with color or monochrome imagery created by blending or combining image signals from the visible light sensor and the infrared sensor. It should be appreciated that the various modes may be described below in reference to digital video signals; however, similar systems may use analog video signals without departing from the scope of the present disclosure.

In one implementation, the image capture component 130 of the system 100A of FIG. 1A may comprise one or more visible light sensors for capturing visible image signals representative of the image 170 and one or more infrared sensors for capturing infrared image signals representative of the image 170. Similarly, in another implementation, each of the image capture components 130A, 130B, 130C of the system 100B of FIG. 1B may comprise one or more visible light sensors for capturing visible image signals representative of the image 170 and one or more infrared sensors for capturing infrared image signals representative of the image 170.

Accordingly, in reference to FIG. 8, the image capture components 130, 130A, 130B, 130C of the systems 100A, 100B, respectively, may comprise at least two sensors, wherein a first sensor is adapted to be sensitive to ambient light in the visible spectrum to provide a visible spectrum image signal 810 and a second sensor is adapted to be sensitive to infrared radiation (i.e., thermal radiation) in the infrared spectrum to provide an infrared spectrum image signal 830. In one aspect, the first and second sensors may be arranged to have identical or at least partly overlapping fields of view (FOV). In another aspect, for improved performance, the first and second sensors may have synchronized frame capture capability such that image signals 810, 830 captured by respective sensors are representative of the same image (e.g., the image 170 or a scene representative of the image 170) as it appears at about the same instant in time for a given pair of frames from the two sensors.

In mode 1, the visible spectrum image signal 810 (i.e., color image) from a visible light sensor is converted to the generally known YCrCb format 814 (or any other format that separates luminance from chrominance). Depending on the type of sensor and the condition under which it is used, some correction terms may be applied 812 to the visible spectrum image signal 810. These correction terms may include, for example, lookup tables used to perform color correction on the image 170. In mode 1, a user input control parameter 820 (e.g., implemented as at least one image control knob) is selected 824 and is adapted to affect a luminance part (Y) 850 of only the visible image 810. For example, the user might control the brightness by applying luminance scaling 816 of the visible image 810 with the parameter ξ821. After optional user control of the luminance signal by not selecting a blended mode 826B, the potentially modified luminance part (Y) 850 is merged with the chrominance parts (Cr and Cb) 852 to form a color video stream 860 for display. Optionally, the chrominance part (Cr and Cb) 852 may be discarded to produce a monochrome video stream.

In mode 2, the infrared spectrum image signal 830 (i.e., infrared image) from an infrared sensor is received and correction terms (such as gain and offset correction) may be applied 832 to the infrared spectrum image signal 830. In one aspect, since infrared sensors tend to produce high dynamic range signals (e.g., up to 14 bit=16384 grey levels), dynamic range compression and scaling may be performed 834 to adapt the infrared image spectrum signal 830 for the display dynamic range (e.g., 8 bit=256 levels of grey). This may be achieved by linear compression; however, non-linear methods, such as histogram equalization, may be utilized. For example, the user may control the dynamic range compression and scaling with the single parameter ξ821 when an infrared only mode is selected 822A with user input control parameter 820. After optional user control of infrared luminance, a geometric transform may be applied 836 to the signal 830. Next, if a blended mode is not selected 826C, the luminance part (Y) 854 of the signal 830 may be directly sent as monochrome video or pseudo colored using some predefined color palette to form an infrared video stream for display 862.

In mode 3, the visible and infrared spectrum image signals 810, 830 are processed in a blended mode 826B, 826C using user control setting 820 after not selecting the infrared only mode 822A and not selecting the visible only mode 824. In mode 3, the user input control parameter ξ821 is adapted to affect the proportions of the two luminance components 850, 854 of the signals 810, 830, respectively. In one aspect, ξ821 may be normalized with a value in the range of 0 (zero) to 1, wherein a value of 1 produces a blended image 864 that is similar to the visible image 860 produced in mode 1. On the other hand, if ξ821 is set to 0, the blended image 864 is displayed with the luminance similar to the luminance of the infrared image 862. However, in the latter instance, the chrominance (Cr and Cb) 852 from the visible image 810 may be retained. Each other value of ξ821 is adapted to produce a blended image 864 where the luminance part (Y) 850, 854, respectively, includes information from both the visible and infrared signals 810, 830, respectively. For example, after selecting the blended mode 826A, ξ821 is multiplied 842 to the luminance part (Y) 850 of the visible image and added 846 to the value obtained by multiplying 844 the value of 1−ξ821 to the luminance part (Y) 854 of the infrared image. This added value for the blended luminance parts (Y) 856 is used to provide the blended image 864.

It should be appreciated that the condition for infrared only modes 822A, 822B may refer to the same condition being checked and/or verified, wherein an infrared only mode of operation is selected via the user input control parameter 820. Moreover, it should also be appreciated that the condition for blended modes 826A, 826B, 826C refers to the same condition being checked and/or verified, wherein a blended mode of operation is selected via the user input control parameter 820.

It should also be appreciated that, in one aspect, the enhanced vision system may automatically select the mode of operation based on the time of day (e.g., day time or night time). It should also be appreciated that, in another aspect, the enhanced vision system may automatically select the mode of operation based on properties of the captured image signals (e.g., SNR: signal-to-noise ratio).

In one embodiment, a blending algorithm may be referred to as true color IR imagery. For example, in daytime imaging, a blended image may comprise a visible color image, which includes a luminance element and a chrominance element, with its luminance value replaced by the luminance value from the infrared image. The use of the luminance data from the infrared image causes the intensity of the true visible color image to brighten or dim based on the temperature of the object. As such, the blending algorithm provides IR imaging for daytime or visible light images.

Generally, luminance refers to a photometric measure of luminous intensity per unit area of light travelling in a given direction. Luminance characterizes emission or reflection of light from flat, diffuse surfaces. Luminance is an indicator of surface brightness as it may appear to a human eye. In one aspect, luminance is used in the video industry to characterize the brightness of displays. Chrominance (i.e., chroma) refers to a difference between a color and a reference color of a same luminance (hue and saturation), wherein Y (luminance), Cr (red diff chroma), and Cb (blue diff chroma) are utilized as image parts. Chrominance (CrCb) is an image signal that conveys color information of an image separately from the accompanying luminance (Y) signal. Chrominance may be represented as two color-difference components: B'-Y' (blue-luma) and R'-Y' (red-luma). Separating RGB (i.e., Red, Green, Blue) color signals into luminance and chrominance allows determination of each color bandwidth to be calculated separately. In reference to video signals, luminance represents the brightness of an image and the achromatic image without any color, and the chrominance of an image represents the color information.

Figure 9:
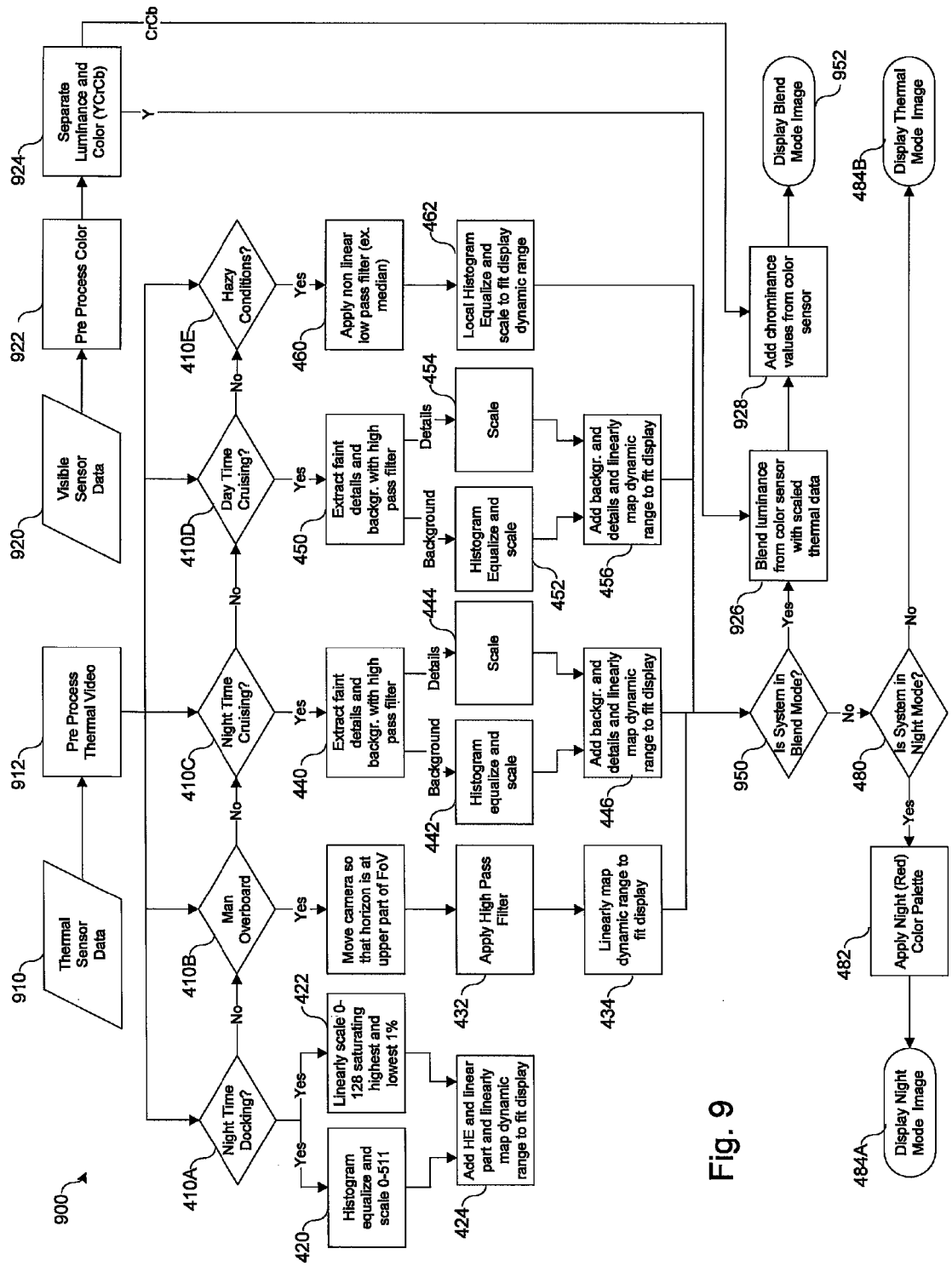
FIG. 9 shows a block diagram illustrating a method for implementing one or more enhanced vision modes of operation and infrared processing techniques related thereto, in accordance with embodiments of the present disclosure.

FIG. 9 shows a block diagram illustrating a method 900 of implementing the enhanced vision modes 1-3 of FIG. 8 and infrared processing techniques related thereto, as described in reference to various embodiments of the present disclosure. In one embodiment, mode 1 refers to a visible light processing mode of operation beginning with obtaining visible sensor data 920 and preprocessing the visible sensor data 922 including color video data, mode 2 refers to a thermal (infrared) processing mode of operation beginning with obtaining thermal sensor data 910 and preprocessing the thermal sensor data 912 including thermal video data, and mode 3 refers to a blending processing mode of operation adapted to blend the thermal sensor data 910 and the visible sensor data 920 to produce a blended image signal including a blended video image signal.

In one embodiment, referring to FIG. 9, the thermal processing mode of method 900 integrates modes 410A-410E of FIG. 4 and infrared processing techniques related thereto, as described in reference to various embodiments of the present disclosure. In particular, the thermal modes of operation include processing techniques related to the night docking mode 410A, the man overboard mode 410B, the night cruising mode 410C, the day cruising mode 410D, and the hazy conditions mode 410E.

Referring to FIG. 9, the processing component 110 of the image capturing system 100A, 100B of FIGS. 1A, 1B is adapted to perform method 900 as follows. Thermal sensor data (i.e., infrared image data) and visible sensor data (i.e., color image data) of a captured image (e.g., image 170) is received or obtained (blocks 910, 920, respectively). Next, the thermal sensor data 910 and the visible sensor data 920 are preprocessed (blocks 912, 922, respectively). In one aspect, preprocessing may include applying correction terms and/or temporal noise reduction to the received sensor data.

In one implementation, after obtaining the thermal sensor data 910 and preprocessing the thermal sensor data 912, at least one of the selected modes 410A-410E may be selected by a user or operator via control component 150 of image capturing system 100A, 100B, and processing component 110 executes the corresponding processing technique associated with the selected mode. In one example, if night docking mode 410A is selected, then the sensor data may be histogram equalized and scaled (e.g., 0-511) (block 420), the sensor data may be linearly scaled (e.g., 0-128) saturating the highest and lowest (e.g., 1%) (block 422), and the histogram equalized sensor data is added to the linearly scaled sensor data for linearly mapping the dynamic range to display component 140 (block 424). In another example, if man overboard mode 410B is selected, then infrared capturing component 130 of image capturing system 100A, 100B may be moved or positioned so that the horizon is at an upper part of the field of view (FoV), a high pass filter (HPF) is applied to the sensor data (block 432), and the dynamic range of the high pass filtered sensor data is then linearly mapped to fit display component 140 (block 434). In another example, if night cruising mode 410C is selected, the sensor data is processed to extract a faint detailed part and a background part with a high pass filter (block 440), the background part is histogram equalized and scaled (e.g., 0-450) (block 442), the detailed part is scaled (e.g., 0-511) (block 444), and the background part is added to the detailed part for linearly mapping the dynamic range to display component 140 (block 446). In another example, if day cruising mode 410D is selected, the sensor data is processed to extract a faint detailed part and a background part with a high pass filter (block 450), the background part is histogram equalized and scaled (e.g., 0-511) (block 452), the detailed part is scaled 0-255 (block 454), and the background part is added to the detailed part for linearly mapping the dynamic range to display component 140 (block 456). In still another example, if hazy condition mode 410E is selected, then a non-linear low pass filter (e.g., median) is applied to the sensor data (block 460), which is then histogram equalized and scaled for linearly mapping the dynamic range to display component 140 (block 462).

In another implementation, after obtaining the visible sensor data 920 and preprocessing the visible sensor data 922, the processing component 110 is adapted to separate a luminance part (Y) and color part (CrCb) from the visible sensor data 920 (block 924). Next, if the blended mode is selected 950 by a user, the processing component 110 is adapted to blend the luminance part (Y) from the visible sensor data 920 with the scaled thermal data (block 926), as provided by at least one of the modes 410A-410E. Next, the processing component 110 is adapted to add chrominance values (CrCb) from the visible sensor data 920 (block 928) and display the blended mode image (block 952).

Otherwise, in one implementation, if the blended mode is not selected 950 by the user, a determination is made as to whether to display the processed thermal sensor data in night mode (i.e., apply the night color palette) (block 480), in a manner as previously described. If yes, then the night color palette is applied to the processed sensor data (block 482), and the processed sensor data is displayed in night mode (block 484A). If no, then the processed thermal sensor data is displayed in a non-night mode manner (e.g., black hot or white hot palette) (block 484B). It should be appreciated that, in night mode, thermal sensor data (i.e., infrared image data) may be displayed in a red or green color palette to improve night vision capacity for a user or operator.

Under certain conditions, it may be desirable for a vehicle (e.g., aircraft, watercraft, land-based vehicle, etc.) to utilize an enhanced vision systems (EVS) to assist a pilot in operating and/or navigating the vehicle. For example, at nighttime, the use of a thermal sensor sensitive to infrared radiation may be advantageous since thermal sensors image even in darkness. In another example, under circumstances where visible light sources exist, it may be desirable for the pilot to see those lights. As such, a visible light sensor sensitive to the visible light spectrum provides an ability to image visible light sources. Accordingly, the methods 800, 900 of FIGS. 8-9, respectively, allow for combing images from infrared and visible wavelength sensors for vehicle applications. In one aspect, by combing image signals (e.g., video signals) from a visible light sensor with image signals (e.g., video signals) from an infrared sensor, a blended or combined image signal may be created that retains color information (if any) from the visible light sensor and shows infrared luminance (irradiation) from the infrared sensor. It should be appreciated that the methods 800, 900 may be operated in a visible only mode, an infrared only mode, and a variable blended visible/infrared mode, without departing from the scope of the present disclosure.

Figure 10:
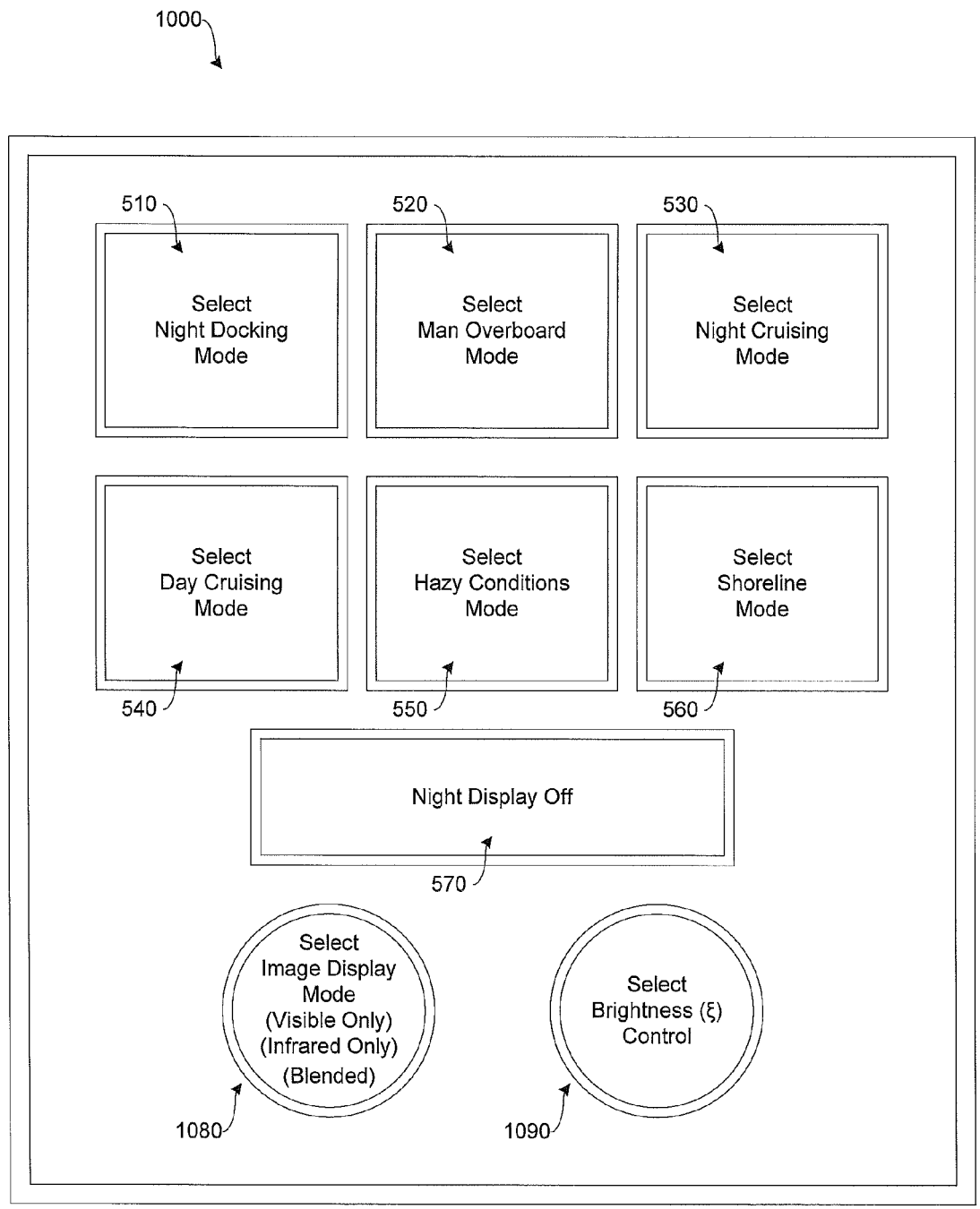
FIG. 10 shows a block diagram illustrating a control component of an enhanced vision system for selecting between one or more enhanced vision modes of operation, in accordance with embodiments of the present disclosure.

FIG. 10 shows a block diagram illustrating one embodiment of the control component 150 of the enhanced vision systems 100A, 100B for selecting between different modes of operation, as previously described in reference to FIGS. 2-4 and 8-9. In one embodiment, the control component 150 of infrared imaging system 100A, 100B may comprise a user input and/or interface device, such as control panel unit 1000 (e.g., a wired or wireless handheld control unit) having one or more control knobs 1080, 1090 and push buttons 510, 520, 530, 540, 550, 560, 570 (as described in reference to FIG. 5) adapted to interface with a user and receive user input control values and further adapted to generate and transmit one or more input control signals to processing component 100A, 100B.

In various other embodiments, the control panel unit 1000 may comprise a slide bar, push button, rotatable knob to select the desired mode, keyboard, etc., without departing from the scope of the present disclosure. For example, the control panel unit 1000 for the enhanced vision systems 100A, 100B comprises a selectable knob with fixed positions, such as nine fixed positions, with hard stops at position 1 and position 9. In one implementation, a first position (1) may be adapted to select an infrared only mode of operation, a ninth position (9) may be adapted to select a visible only mode of operation, and second to eighth intermediate positions (2 thru 8) may be adapted to select and produce a blended video image having increasing amounts of visible luminance being added for each selected increment, which is described in greater detail herein.

In another embodiment, the control panel unit 1000 may comprise a joystick control device, such as a joystick control unit (JCU), an auto-centering JCU, etc., where proportional control is used to add (e.g., with a clockwise (CW) rotation) or subtract (e.g., with a counter clockwise (CCW) rotation) visible-band content from a starting admixture of 50% (e.g., by default) or a user defined default admixture. At either rotational limiting position (e.g., CW or CCW), there is a hard stop that represents 100% visible image spectrum (VIS) or 100% infrared image spectrum (IIS) output, respectively. In one implementation, an on-screen display (OSD) overlay may be utilized to indicate a percentage (%) of admixture for blending luminance of visible and infrared spectrums.

In one embodiment, visible cameras and thermal cameras may only allow for some maximum gain of the video signal. A gain limit ensures that noise components in the image are limited so that the video signal is usable. The gain limit may limit the visible or thermal video signal such that they do not use the full output dynamic range available. For example, the visible signal luminance component may only be 100 counts out of an available 256 counts in the 8-bit domain. In this case, it is advantageous to rescale the two luminance components (i.e., visible and thermal luminance components) so that the visible part is relatively less than what the user or system has selected. In one aspect, a user may have set the blending factor such that half of the luminance (e.g., $\xi=0.5$) in the blended output comes from the visible luminance channel. The remaining 50% of the luminance comes from the thermal video component. In reference to the limited dynamic range of the visible video component, an adjusted blending factor $\xi_a$ may be calculated based on the control parameter ($\xi$) that the user may have selected such that $\xi_a=(1-\xi)+\xi((256-100)/256)\approx0.8$, in one example. The luminance blending algorithm may then be $L_{blend}=\xi_a L_{ir}+\xi L_{vis}$, where $L_{ir}$ and $L_{vis}$ refer to the thermal and visible luminance components, respectively, and $L_{blend}$ is the resulting blended luminance.

Figure 11A:
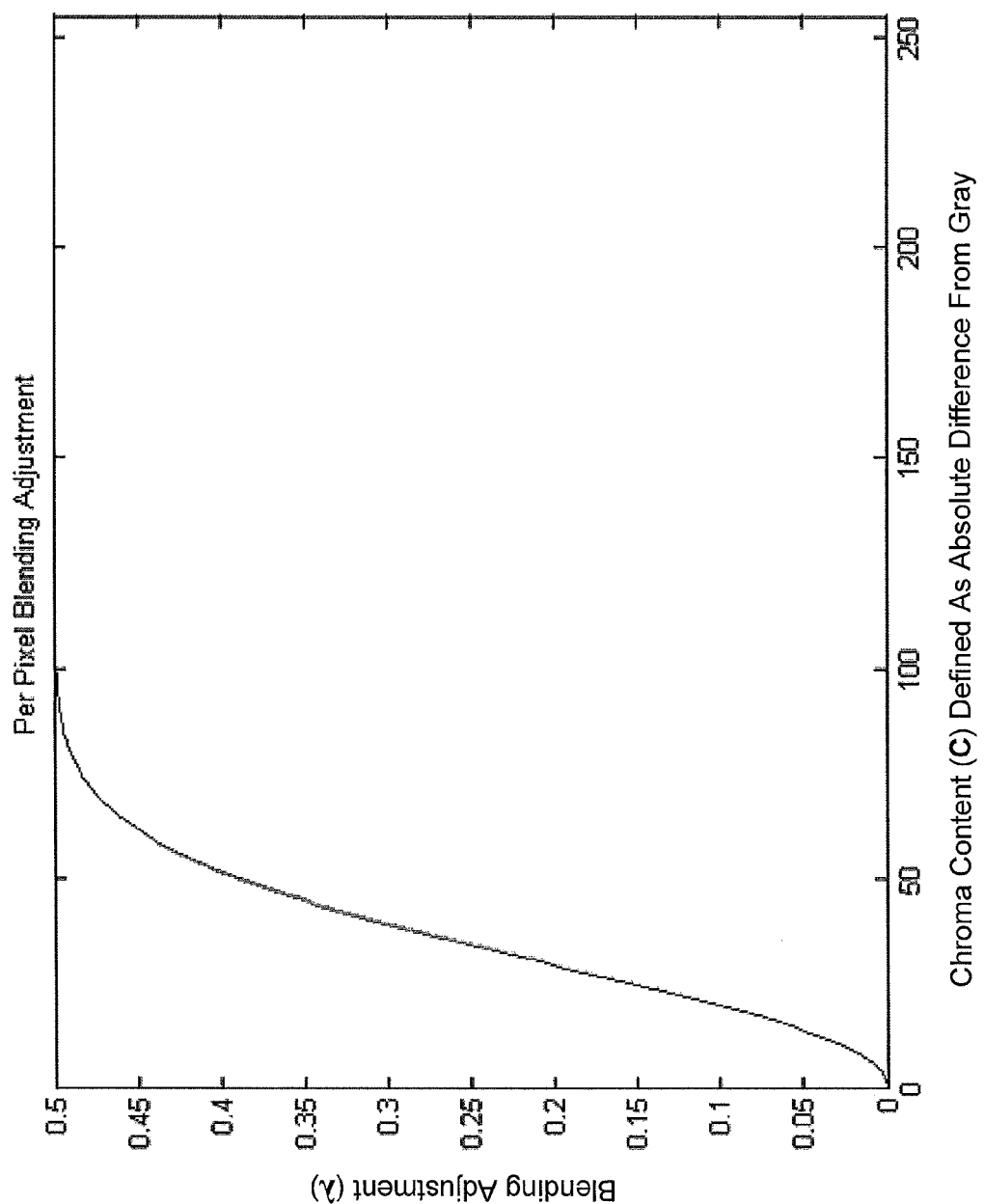
FIG. 11A shows a graph diagram of a per pixel blending adjustment, in accordance with an embodiment of the present disclosure.

In one implementation, if the luminance is substantially low, e.g., close to black, it may be difficult for a human observer to notice color variations. Hence, as an improvement of the luminance blending, the chrominance values may be utilized to adjust the blending percentages on a per pixel basis. In a YCrCb format, gray is represented by the Cr and Cb values being at the midpoint of their dynamic range, e.g., 128 for 8-bit representation. In this example, a pixel may be defined to contain more color information when deviating by varying degrees from a center value of its Cr and Cb channels. In one aspect, a measure of color content may comprise the sum of absolute differences from gray, e.g., $C=abs(Cr-128)+abs(Cb-128)$, where C may be primitively interpreted as amount of color. Assuming the color is visible in the original visible video stream, the blending factor ($\xi$) may be adjusted on a per pixel level such that pixels with significant color content (e.g., large values for C) are weighted more towards the visible sensor luminance. For example, a blending parameter $\lambda_{i,j}(C_{i,j})$ may be defined such that $\lambda$ is monotonically increasing for increasing values of C, e.g., a Gaussian function may be used, as shown in FIG. 11A. The color adjusted blending factor $\xi_c$ may be defined as the sum of the user selected blending factor $\xi_u$ and the color factor $\lambda$. If $\xi_c$ is limited to the range 0-1, then the blending equation may be written $L_{blend}=(1-\xi_c)L_{ir}+\xi_c L_{vis}$. As will be clear to someone skilled in the art, other normalized weighting schemes may also be used to shift luminance content towards the visible component for pixels with significant color content.

Figure 11B:
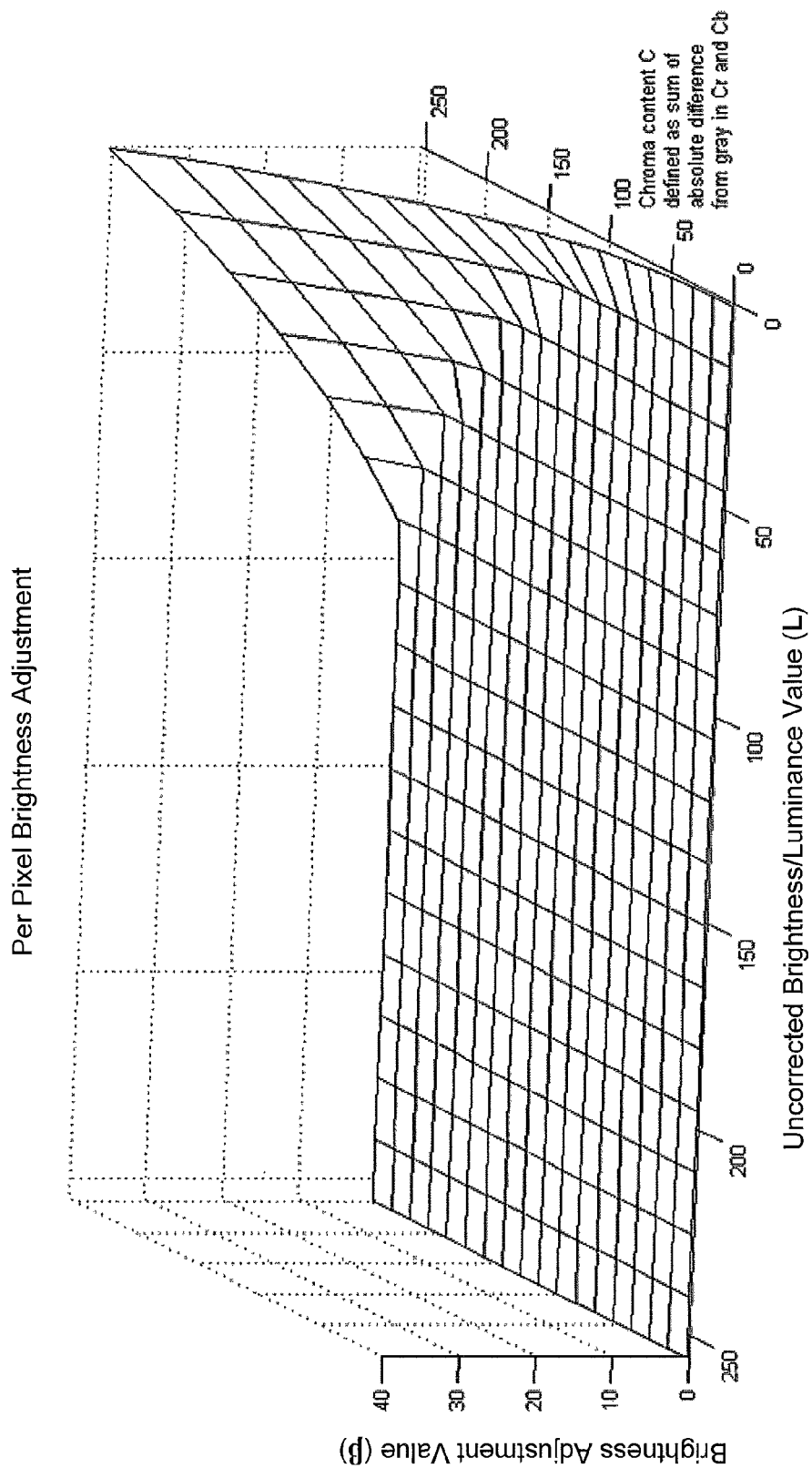
FIG. 11B shows a graph diagram of a per pixel brightness adjustment, in accordance with an embodiment of the present disclosure.

In another implementation, another approach to prevent color information in dark areas to be lost in the blended video is to brighten dark areas, if they have color content. For example, this may be achieved by adding a luminance offset to all pixels with some color content (e.g., as defined by the parameter C) above some predefined threshold. A smoother transition is achieved if the offset is proportional to C. For larger absolute differences from gray (e.g., large C) a larger luminance offset is added. In one aspect, parts of the image that are already bright need not be brightened further, and therefore, the brightness offset may be lower for already bright areas. A brightness correction function $\beta_{i,j}(C_{i,j},L)$ may be defined, where $\beta$ is increasing for increasing values for C and decreasing for increasing values of L. An example of such a function is shown in FIG. 11B.

In various implementations, a plurality of control knobs 1080, 1090 of control panel unit 1000 may be utilized to select between various modes of operation (i.e., visible display only, infrared display only, and blended display modes), as previously described in reference to FIGS. 8-9. In various implementations, processing component 110 may be adapted to sense control input signals from control panel unit 1000 and respond to any sensed control input signals received from control knobs 1080, 1090. Processing component 110 may be adapted to interpret the control input signals as values. In various other implementations, it should be appreciated that control panel unit 1000 may be adapted to include one or more other control knobs or push buttons (not shown) to provide various other control functions of infrared imaging system 100A, 100B, such as auto-focus, menu enable and selection, field of view (FoV), and/or various other features. In another embodiment, control panel unit 1000 may comprise a single control knob to select image display modes 1-3 of FIGS. 8-9.

In another embodiment, control panel unit 1000 may be adapted to be integrated as part of display component 140 to function as both a user input device and a display device, such as, e.g., a user activated touch screen device adapted to receive input signals from a user touching different parts of the display screen. As such, the GUI interface device may have one or more images of, e.g., control knobs 1080, 1090 adapted to interface with a user and receive user input control values via the touch screen of display component 140.

In one embodiment, referring to FIG. 10, a first control knob 1080 may be enabled to select at least one of enhanced vision mode of operation, such as mode 1 (i.e., visible mode only), mode 2 (i.e., infrared mode only), and mode 3 (blended mode). For example, referring to FIG. 8, the first control knob 1080 provides the same scope and features of the user input control 820. In another embodiment, a single push button for control panel unit 1000 may be used to toggle between each of the enhanced display modes 1-3, without departing from the scope of the present disclosure.

In one embodiment, referring to FIG. 10, a second control knob 1090 may be enabled to select a value from 0-1 for the parameter ξ821, as described in reference to FIG. 8. As previously described, each value of ξ821 (i.e., from 0-1) is adapted to produce a blended image for display where the luminance part (Y) of the blended image includes information from both the visible and infrared spectrum signals.

In maritime applications, embodiments of the present disclosure have some valuable uses. For example, when navigating at night, an electro-optical (E/O) camera may typically only be able to image, or may be managed to only image, a few point sources of light, such as buoys, lights on other boats, lights on land, or lighthouses. With no other reference, it may be difficult to determine which of these sources the light belongs. The thermal imager may be adapted to clearly show buoys, islands, other boats, etc., but may not show the color of any lights. Looking at either of the two sensor outputs on a display, an operator of the boat may lack essential information for navigation. For example, in one aspect, it may be difficult to determine whether a light is visible in the video from the E/O imager is from a source on land or from a buoy. In another aspect, given knowledge that a point source is providing maritime navigation guidance, reliance solely on limited E/O radiance output may be insufficient for safe navigation. Similarly, in the video from the thermal imager, several buoys might be clearly visible but the lack of color information and can make it hard to determine the appropriate path to navigate. Fusing information from the E/O and thermal imager as described herein provides the operator of the vessel with all necessary information in a single video stream. Specifically, correlation of the output between the visible-band and infrared-band cameras is performed for the user such that the operator may be able to tell which light belongs to a source on land (e.g., a car) and which light belongs to a buoy.

In an enhanced vision system (EVS) for aircraft, the video blending system described herein is an important navigation aid. When attempting to land at night (under reasonable conditions for thermal imaging), a thermal camera provides the operator of the aircraft with an image of an airfield and its surroundings. For rural airports, the thermal imager may detect obstacles, such as vehicles, animals, and/or people on a runway. These objects may be visible even in poor or zero light conditions. An imager sensitive to light in the visible light spectrum (E/O imager) may only (under conditions described above) pick up visible light sources, such as runway lights, warning lights, street lights, and/or lights on other planes or vehicles. A color E/O imager may be able to, e.g., distinguish red lights from green or white lights, which may in some situations be of importance to the operator of the aircraft. During takeoff, landing, or while taxiing, the pilot wants minimal distraction. Looking at two separate video streams and trying to figure out which light, imaged by the E/O system, go with which structure, imaged by the thermal system, can be a distraction. The combining vision system strives to present a pre-correlated blend of critical scene information, e.g., colored light sources for navigation and thermal radiance for situational awareness to support safe navigation with reduced operator distraction. In this case, a single video stream showing color information from the E/O video merged with the thermal video from a thermal imager is advantageous and gives the pilot maximum information with minimum distraction.

Driving at night in suburban or rural areas limits driver vision to sections lit up by headlights and/or street lights. Thermal cameras provide situational overview, and thermal cameras have the added advantage of not being "blinded" by head beams from oncoming traffic. An E/O camera is typically able to image traffic signs, traffic lights, license plates, vehicle warning lights, and road markings with greater detail and contrast than the thermal imager. However, in accordance with embodiments of the present disclosure, a fused or blended image provides drivers, passengers, and/or remote operators with more information than any one of the video streams alone as a single output instead of requiring the viewer to correlate the output between the separate display of two-band camera systems. In an automatic collision avoidance system, the added information from the two blended wave bands may also provide better accuracy (e.g., lower false pedestrian detection rates).

In a handheld system with both E/O and thermal imagers, the video blending scheme described herein is useful in a number of scenarios. When operating at night, colored lights may appear in a thermal representation of the scene when operating in blended mode. Areas lit up by, for example, a flashlight may also benefit from the color information captured by the E/O imager. Specifically, it may be easy for a user to see which area is lit up by looking at the blended video stream and clearly seeing the light beam from the flash light in reference to the entire scene, which may be visible only in the thermal spectrum.

In daytime operation, best situational overview may be achieved using an E/O imager due to retention of color information, which closely resembles what is seen with the human eye. When looking for something with a thermal contrast, such as a person, animal, fluid spill, etc., the thermal imager may provide a better chance of detection. Moreover, in bright daytime scenes, the thermal imager may provide radiance information in shadowed regions that would be lost to an E/O imager handling a wide daytime dynamic range. As such, merging the wave bands as described herein may provide the user with a color overview of the scene with added contrast for objects with thermal signatures making such a tool useful in a number of applications including law enforcement, inspection, and/or personal use.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

In various embodiments, software for mode modules 112A-112N may be embedded (i.e., hard-coded) in processing component 110 or stored on memory component 120 for access and execution by processing component 110. As previously described, the code (i.e., software and/or hardware) for mode modules 112A-112N define, in one embodiment, preset display functions that allow processing component 100A, 100B to switch between the one or more processing techniques, as described in reference to FIGS. 2-4 and 8-9, for displaying captured and/or processed infrared images on display component 140.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. An enhanced vision system comprising:
    a visible light sensor adapted to capture a visible light image;
    an infrared sensor adapted to capture an infrared image, wherein the infrared image is a thermal infrared image comprising thermal information from an infrared wavelength spectrum;
    a control component adapted to receive a user input corresponding to a user selected control parameter;
    a processing component adapted to extract a luminance part from the captured visible light image, extract a luminance part from the captured infrared image, scale the luminance parts based on the control parameter, and merge the scaled luminance parts to generate an output image; and
    a display component adapted to display the output image.

2. The system of claim 1, wherein:
    the visible light sensor is adapted to capture one or more visible light images and provide visible light sensor data related to the captured visible light images,
    the infrared sensor is adapted to capture one or more infrared images and provide infrared sensor data related to the captured infrared images,
    the processing component is adapted to receive and process the visible light sensor data and the infrared sensor data to generate output image data, and
    the display component is adapted to display one or more output images based on the output image data generated by the processing component.

3. The system of claim 2, wherein the processing component is adapted to extract a luminance data part from the visible light sensor data, extract a luminance data part from the infrared sensor data, scale the luminance data parts, and merge the scaled luminance data parts to generate the output image data.

4. The system of claim 1, further comprising:
    a control component adapted to provide a plurality of selectable processing modes and generate a control signal indicative of a selected processing mode, wherein the plurality of selectable processing modes includes a night cruising mode, a day cruising mode, and a man overboard mode; and
    wherein the processing component is adapted to receive the generated control signal from the control component and process the captured infrared image according to the selected processing mode.

5. The system of claim 4, further comprising:
    a memory component adapted to store one or more of the captured visible light image, the captured infrared image, and the output image;
    wherein the plurality of selectable processing modes includes a hazy conditions mode that causes the processing component to apply a non-linear low pass filter on the captured infrared image, and then histogram equalize and scale the captured infrared image; and
    wherein the display component is adapted to display the output image in a red color palette or a green color palette in a night display mode.

6. The system of claim 1, further comprising:
    a control component adapted to provide a plurality of selectable processing modes to a user, receive user input corresponding to a user selected processing mode, and generate a control signal indicative of the user selected processing mode;
    wherein the plurality of selectable processing modes includes a visible light only mode, infrared only mode, and at least one combined visible-infrared mode;
    wherein the processing component is adapted to receive the generated control signal from the first control component, process the captured visible light images and the captured infrared images according to the user selected processing mode, and generate one or more output images based on the processing mode selected by the user; and
    wherein the display component is adapted to display the output images based on the processing mode selected by the user.

7. The system of claim 6, wherein the plurality of selectable processing modes includes the visible light only mode that causes the processing component to generate the processed images from only the captured visible light images, and wherein the visible light images comprise color information or monochrome information from the visible light wavelength spectrum.

8. The system of claim 6, wherein the plurality of selectable processing modes includes the infrared only mode that causes the processing component to generate the processed images from only the captured infrared images.

9. The system of claim 6, wherein the plurality of selectable processing modes includes the combined visible-infrared mode that causes the processing component to generate the output image by combining the scaled luminance part of the captured visible light image with the scaled luminance part from the captured infrared image.

10. The system of claim 1, wherein the control component is adapted to generate a control signal indicative of the user selected control parameter.

11. The system of claim 10, wherein the selectable control parameter provides a selectable range of values, and wherein a first value causes the processing component to generate the processed image from only the captured visible light images, and wherein a second value causes the processing component to generate the processed images from only the captured infrared images, and wherein one or more other values between the first and second values causes the processing component to generate the processed images from proportional values of the luminance parts of the captured visible light images and the captured infrared images, and wherein the selectable control parameter is adjusted to increase or decrease a gain value of the luminance parts.

12. The system of claim 1, wherein the display component is adapted to display the output image as at least one of a visible light only image, an infrared only image, and a combined visible-infrared image having portions of both the visible light only image and the infrared only image.

13. The system of claim 1, wherein the captured visible light image comprises the luminance part and a chrominance part, and wherein the captured infrared image comprises only a luminance part, and wherein the processing component is adapted to extract the luminance part and the chrominance part from the captured visible light image, extract only the luminance part from the captured infrared image, scale the luminance parts, and merge the luminance parts and the chrominance part to generate the output image.

14. A method comprising:
obtaining visible light sensor data;
obtaining infrared sensor data, wherein the infrared sensor data comprises thermal information from an infrared wavelength spectrum;
receiving a user input corresponding to a user selected control parameter;
extracting a luminance data part from the visible light sensor data;
extracting a luminance data part from the infrared sensor data;
scaling the luminance data parts based on the control parameter;
merging the scaled luminance data parts to generate output image data; and
displaying an output image based on the output image data.

15. The method of claim 14, further comprising:
capturing one or more visible light images and providing the visible light sensor data related to the captured visible light images;
capturing one or more infrared images and providing the infrared sensor data related to the captured infrared images;
providing a plurality of selectable processing modes to a user, wherein the plurality of selectable processing modes includes a visible light only mode, infrared only mode, and at least one combined visible-infrared mode;
receiving a user input corresponding to a user selected processing mode;
processing the captured visible light images and the captured infrared images based on the user selected processing mode;
generating one or more output images based on the user selected processing mode; and
displaying the one or more output images based on the user selected processing mode.

16. The method of claim 15, wherein:
the one or more output images comprise visible light only images when the visible light only mode is selected by the user,
the one or more output images comprise infrared only images when the infrared only mode is selected by the user, and
the one or more output images comprise combined visible-infrared images when the combined visible-infrared mode is selected by the user.

17. The method of claim 16, wherein:
the visible light images comprise color information or monochrome information from the visible light wavelength spectrum, and
the combined visible-infrared images comprise blended luminance parts of the captured visible light images and the captured infrared images.

18. The method of claim 15, further comprising:
generating a control signal indicative of the user selected control parameter,
wherein the selectable control parameter comprises a value in the range of 0 (zero) to 1,
wherein a value of 1 is used to generate the one or more output images from only the captured visible light images,
wherein a value of 0 (zero) is used to generate the one or more output images from only the captured infrared images,
wherein values between 0 (zero) and 1 is used to generate the one or more output image from proportional parts of both the captured visible light images and the captured infrared images, and
wherein the selectable control parameter is adjustable to increase or decrease a gain value of the captured visible light images and the captured infrared images.

19. The method of claim 14, wherein displaying the output image comprises displaying at least one of a visible light only image, an infrared only image, and a combined visible-infrared image having portions of both the visible light only image and the infrared only image.

20. The method of claim 14, further comprising:
storing one or more of the visible light sensor data, the infrared sensor data, and the output image data;
providing a plurality of selectable processing modes, wherein the plurality of selectable processing modes includes a night docking mode, a man overboard mode, and a night cruising mode; and
processing the infrared sensor data according to one of the selectable processing modes.

21. The method of claim 14, wherein the visible light sensor data comprises a luminance data part and a chrominance data part, and wherein the infrared sensor data comprises only a luminance data part, and wherein the method further comprises extracting the luminance data part and the chrominance data part from the visible light sensor data, extracting the luminance data part from the infrared sensor data, scaling the luminance parts, and merging the luminance parts and the chrominance part to generate the output image data.

22. A non-transitory computer-readable medium on which is stored information for performing a method, the method comprising:
obtaining visible light sensor data;
obtaining infrared sensor data, wherein the infrared sensor data comprises thermal information from an infrared wavelength spectrum;
receiving a user input corresponding to a user selected control parameter;
extracting a luminance data part from the visible light sensor data;
extracting a luminance data part from the infrared sensor data;
scaling the luminance data parts based on the control parameter;
merging the scaled luminance data parts to generate output image data; and
displaying an output image based on the output image data.

23. The non-transitory computer-readable medium of claim 22, wherein the visible light sensor data comprises color information or monochrome information from the visible light wavelength spectrum, and wherein the infrared sensor data comprises thermal information from the infrared wavelength spectrum, and wherein the output image is generated by combining a part of the visible light sensor data with a part from the infrared sensor data.

24. The non-transitory computer-readable medium of claim 22, wherein the visible light sensor data comprises the luminance data part and a chrominance data part, and wherein the infrared image data comprises only the luminance data part, and wherein the method further comprises extracting the chrominance data part from the visible light sensor data, and merging the scaled luminance data parts and the chrominance data part to generate the output image based on a processing mode selected by the user.

* * * * *